United States Patent [19]
Rosow et al.

[11] Patent Number: 5,923,416
[45] Date of Patent: Jul. 13, 1999

[54] AUTOMATED METHOD AND APPARATUS FOR EVALUATING THE PERFORMANCE CHARACTERISTICS OF ENDOSCOPES

[75] Inventors: Eric Rosow, Avon; Joseph Adam, West Hartford, both of Conn.

[73] Assignee: Hartford Hospital, Hartford, Conn.

[21] Appl. No.: 08/822,283

[22] Filed: Mar. 20, 1997

[51] Int. Cl.$^6$ .................................................. G01M 11/00
[52] U.S. Cl. ........................................................ 356/124.5
[58] Field of Search ................................ 356/124, 124.5, 356/125, 121, 127, 73, 73.1, 237, 239, 430; 33/281, 1 BB; 250/227, 205, 572

[56] References Cited

U.S. PATENT DOCUMENTS

| | | | |
|---|---|---|---|
| 4,349,014 | 9/1982 | Takamatsu | 128/6 |
| 4,375,818 | 3/1983 | Suwaki et al. | 128/660 |
| 4,402,311 | 9/1983 | Hattori | 128/4 |
| 4,543,477 | 9/1985 | Doi et al. | 250/227 |
| 4,562,344 | 12/1985 | Mihara et al. | 250/201 |
| 4,590,924 | 5/1986 | Tanikawa et al. | 128/6 |
| 4,613,232 | 9/1986 | Diener et al. | 356/124 |
| 4,621,618 | 11/1986 | Omagari | 128/6 |
| 4,686,964 | 8/1987 | Yunoki et al. | 128/4 |
| 4,716,288 | 12/1987 | Doi | 250/227 |
| 4,742,815 | 5/1988 | Ninan et al. | 128/6 |
| 4,930,861 | 6/1990 | Okabe et al. | 350/96.25 |
| 4,996,975 | 3/1991 | Nakamura | 128/6 |
| 5,045,934 | 9/1991 | Kikuchi | 358/98 |
| 5,115,126 | 5/1992 | Ams et al. | 250/227.11 |
| 5,270,825 | 12/1993 | Takasugi et al. | 358/209 |
| 5,444,574 | 8/1995 | Ono et al. | 359/708 |
| 5,469,840 | 11/1995 | Tanii et al. | 600/117 |
| 5,503,320 | 4/1996 | Webster et al. | 227/176.1 |
| 5,534,992 | 7/1996 | Takeshima et al. | 356/5.1 |
| 5,539,971 | 7/1996 | Kelly | 29/418 |
| 5,545,120 | 8/1996 | Chen et al. | 600/117 |
| 5,747,794 | 5/1998 | Malchesky | 250/227.23 |

*Primary Examiner*—Frank G. Font
*Assistant Examiner*—Michael P. Stafira
*Attorney, Agent, or Firm*—McCormick, Paulding & Huber

[57] ABSTRACT

In an automated method and apparatus for evaluating the performance characteristics of endoscopes, a computer system receives and stores a first set of test signals indicative of the results of the tests performed. Each test is preferably performed by transmitting a beam of light defining a predetermined intensity pattern through the endoscope from a first end to a second end of the endoscope, and the test signals are indicative of the optical intensity at each of a plurality of predetermined locations within the transmitted beam. The test signals thereby provide an indication of the degree to which the endoscope attenuates the beam intensity. In the preferred embodiment, the following tests are performed in order to evaluate both the optical fibers and lens system of each endoscope: (i) a light loss test, (ii) a reflective symmetry test, (iii) a lighted fibers test, (iv) a geometric distortion test, and (v) a modulation transfer function (MTF) test. The computer system has a database of threshold values, each of which corresponds to a respective test and is used to determine if test results indicate acceptable or unacceptable performance characteristics. The test signals are compared with the threshold values, and the computer system generates a second set of signals indicative of one or more performance characteristics, which are responsive to both the test signals and signals indicative of the test type.

21 Claims, 18 Drawing Sheets

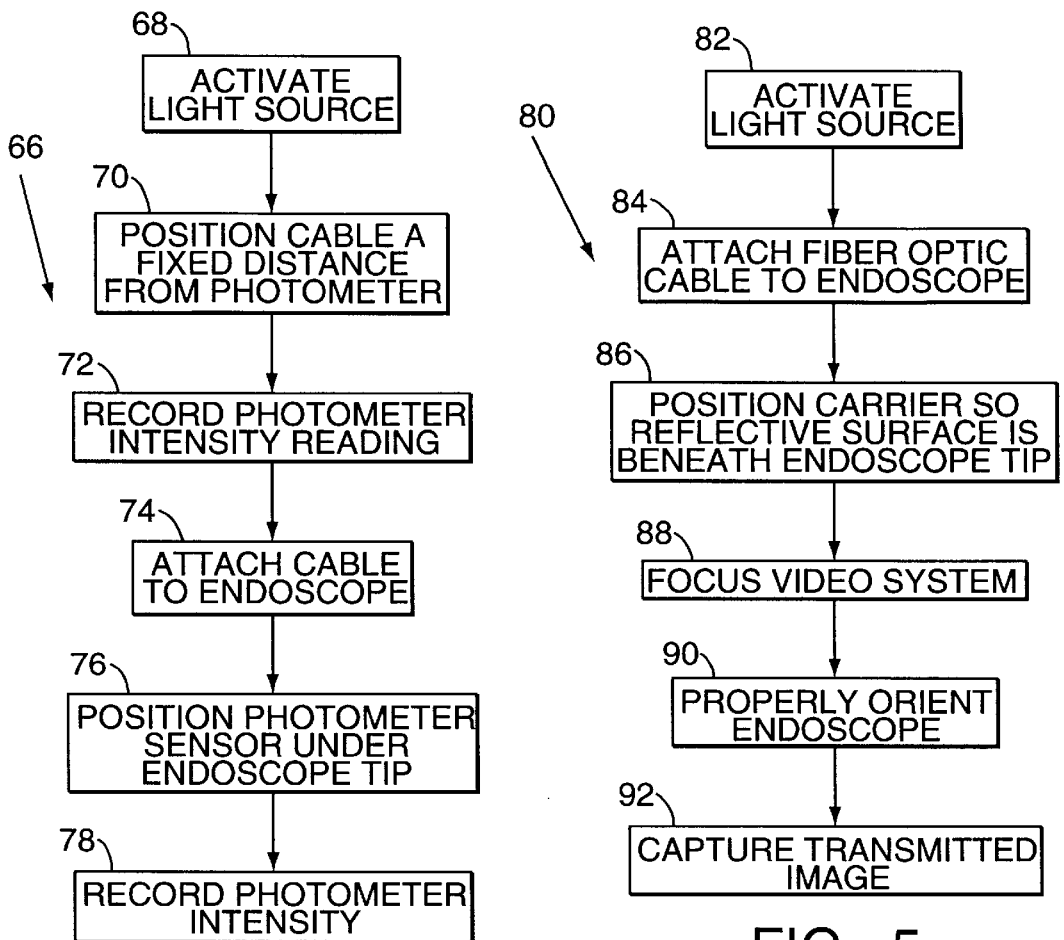
FIG. 4
FIG. 5
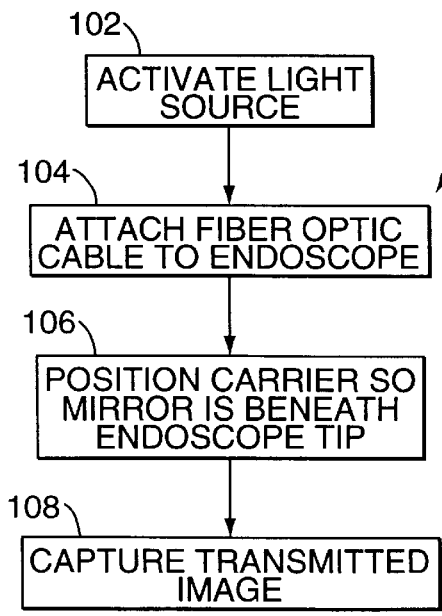
FIG. 6

AUTOMATED METHOD AND APPARATUS FOR EVALUATING THE PERFORMANCE CHARACTERISTICS OF ENDOSCOPES

FIELD OF THE INVENTION

The present invention relates to methods and apparatus for testing fiber optic endoscopes, and more particularly, to such methods and apparatus for automatically generating graphical and alphanumerical indicia of the optical performance characteristics of such endoscopes.

CROSS REFERENCE TO RELATED APPLICATIONS

Some of the matter contained herein is disclosed in U.S. patent application Ser. No. 08/821,112, entitled "METHOD AND APPARATUS FOR EVALUATING THE PERFORMANCE CHARACTERISTICS OF ENDOSCOPES" (Attorney Docket No. 5509-01); U.S. patent application Ser. No. 08/822,330, entitled "METHOD AND APPARATUS FOR PERFORMING MODULATION TRANSFER FUNCTION TESTS ON ENDOSCOPES" (Attorney Docket No. 5509-02); and U.S. patent application Ser. No. 08/821,601, entitled "APPARATUS FOR EVALUATING THE PERFORMANCE CHARACTERISTICS OF ENDOSCOPES" (Attorney Docket No. 5509-03), each of which is being filed on even date herewith, is assigned to the Assignee of the present invention, and is hereby expressly incorporated by reference as part of the present disclosure.

BACKGROUND OF THE INVENTION

A typical endoscope comprises a cylindrical stainless steel case enclosing a bundle of optical fibers extending between a distal end (tip end) and proximal end of the endoscope for transmitting light through the endoscope. A fiber optic cable delivers light from a light source into the case through an aperture situated near the proximal end of the endoscope. The optical fibers transmit the light through to the distal end, where the light exits the endoscope and illuminates the area near the distal end. The endoscope in turn transmits an image of that area through a rod and lens system to an eyepiece lens at the proximal end. A video camera coupled to the eyepiece converts the image into electronic signals and transmits the signals to a video monitor, where the image is displayed.

Endoscopes are used most often in "minimally invasive surgery", in which an endoscope is inserted into a patient, allowing a surgeon to illuminate and view the interior of the patient with minimal penetration. The use of endoscopic surgery is growing, in large part because it is generally safer and less expensive than conventional surgery, and patients tend to require less time in a hospital after endoscopic surgery. Conservative industry experts estimate that about 4 million minimally invasive procedures were performed in 1996. As endoscopic surgery becomes more common, there is an increasing need to accurately evaluate the performance characteristics of endoscopes.

To obtain a true measure of the performance of an endoscope, both the lens and the optical fibers should be evaluated. For example, some optical fibers may be damaged and only partially transmit light. In addition, the lens may distort images or blur the sharpness of image colors. These and other shortcomings in the optical performance of endoscopes may be the result of imperfections in the manufacturing process and/or may develop as the endoscope is used over time.

Since endoscopes have various different performance characteristics, several tests should be performed in order to evaluate these characteristics. Endoscopes are most often used in hospitals and other clinical environments, rather than in facilities having specialized endoscope testing capabilities, and therefore the tests performed on endoscopes should not be overly complicated, but rather should be capable of performance by the average clinical worker. Similarly, it would be preferable to perform and analyze the results of the tests completely within the clinical environment, without the need for input from experts in such fields as fiber optics or lens systems. Accordingly, an apparatus for evaluating the performance characteristics of endoscopes ideally would be simple to operate, and would automatically provide an evaluation of the performance characteristics of endoscopes without manual calculation or expert knowledge or analysis.

In addition, an apparatus for evaluating the performance characteristics of endoscopes ideally would be able to allow a user to practice performing the endoscope tests, and would provide corrective instructions when the user fails to perform a test correctly.

It would also be desirable for an automated apparatus to account for a variety of different factors when evaluating the results of an endoscope test. A set of test results may not be determinative of endoscope performance without having information on the endoscope that was tested, such as the endoscope diameter, length and tip angle. For example, the same test results may indicate that an endoscope is acceptable if the endoscope tested has a diameter of 10 millimeters, but that the endoscope is unacceptable if the endoscope tested has a diameter of 4 millimeters. Accordingly, such endoscope-specific information would need to be assessed in order to accurately evaluate endoscope performance characteristics.

An apparatus for evaluating the performance characteristics of endoscopes would also be able to validate claims made by endoscope vendors about the capabilities of their products. Accordingly, such an apparatus would be advantageous for the purchasers and users of endoscopes. In addition, such an apparatus would be of great use in evaluating disposable endoscopes, which currently have an average life of about 20 to 30 uses. An apparatus for evaluating the performance characteristic of endoscopes would be able to determine when a disposable endoscope is so degraded that it should be discarded.

Furthermore, an endoscope may be adequate for one surgical procedure but inadequate for another which requires more precision, such as when a patient is bleeding. Currently, an endoscope which is suspected of having any deficiency must be removed from service and sent for repair, which can be both costly and time consuming. An apparatus for evaluating the performance characteristics of endoscopes would preferably be able to identify endoscopes which are appropriate for one type of procedure although inadequate for another.

Such an apparatus would also be most advantageous in a program of preventative endoscope maintenance. Endoscopes cost thousands of dollars, and typically require repairs at least about twice per year which can cost several thousand dollars per repair. There is a need for a tool for evaluating the performance characteristics of endoscopes, thereby verifying if repairs have been effective.

An apparatus for evaluating endoscope performance ideally would also be able to store the results of past tests and evaluations, thereby allowing the system to evaluate changes in endoscope performance after repair operations and over the lifetime of the endoscope. In addition, such information on changes in endoscope performance would be useful in predicting changes in the performance of other endoscopes before their performance degrades. This would help predict future endoscope needs.

The present inventors are not aware of any commercially available tools for use in a clinical environment which quantitatively assess the performance characteristics of endoscopes, nor are they aware of any such tools that automatically generate graphical and alphanumerical indicia of the optical performance characteristics of endoscopes.

Accordingly, it is an object of the present invention to provide such a method and apparatus for evaluating the optical performance characteristics of fiber optic endoscopes.

SUMMARY OF THE INVENTION

The present invention is directed generally to an apparatus and method for evaluating the optical performance characteristics of endoscopes in dependence on the results of a plurality of endoscope tests.

According to the present invention, a computer system receives and stores a first set of test signals indicative of the results of the tests performed. Each test is preferably performed by transmitting a beam of light defining a predetermined intensity pattern through the endoscope from a first end to a second end of the endoscope, and the test signals are indicative of the optical intensity at each of a plurality of predetermined locations within the transmitted beam. The test signals thereby provide an indication of the degree to which the endoscope attenuates the beam intensity. In the preferred embodiment, the following tests are performed in order to evaluate both the optical fibers and lens system of each endoscope: (i) a light loss test, (ii) a reflective symmetry test, (iii) a lighted fibers test, (iv) a geometric distortion test, and (v) a modulation transfer function (MTF) test.

In accordance with a further aspect of the invention, the computer system has a database of threshold values, each of which corresponds to a respective test and is used to determine if test results indicate acceptable or unacceptable performance characteristics. The test signals are compared with the threshold values, and the computer system generates a second set of signals indicative of one or more performance characteristics, which are responsive to both the test signals and signals indicative of the test type. The computer system thus analyzes the test results and evaluates the performance of the endoscope, and stores the test results and evaluations in a database for future retrieval and use.

The computer system preferably further provides a graphical user interface for directing the user and allowing the user to perform such tasks as initiating endoscope evaluation and viewing test results in graphical form. The graphical user interface typically provides displays of test results as twodimensional or three-dimensional images indicative of the intensity of the transmitted beam. Other displays of test results are presented in numerical, alphanumerical and/or graphical form.

In the preferred embodiment of the invention, the graphical user interface provides detailed instructions on how to configure test equipment and perform the various tests. The computer system of the invention preferably also controls the performance of the steps involved in each test, and indicates to the user when manual intervention is required.

The preferred embodiment of the invention is a relatively low-cost system which can rapidly and accurately evaluate the optical performance of endoscopes. The preferred system can also accurately assess the effectiveness of repair operations performed on endoscopes, and can determine and record changes in the optical performance characteristics of endoscopes over their lifetimes.

One advantage of the present invention is that it is particularly suitable for application in a clinical environment in order to quantitatively assess the performance characteristics of endoscopes, and in turn automatically generate graphical and alphanumerical indicia of the optical performance characteristics of the endoscopes. Accordingly, endoscope performance can be relatively easily evaluated without manual calculation or expert knowledge.

Other advantages of the apparatus and method of the present invention will become apparent in view of the following detailed description and accompanying drawings.

BRIEF DESCRIPTION OF THE DRAWINGS

FIG. 4 is a flow chart illustrating conceptually the procedural steps for performing a light loss test on the endoscopes in the apparatus of FIG. 1.

FIG. 5 is a flow chart illustrating conceptually the procedural steps for performing a reflective symmetry test on the endoscopes in the apparatus of FIG. 1.

FIG. 6 is a flow chart illustrating conceptually the procedural steps for performing a lighted fibers test on the endoscopes in the apparatus of FIG. 1.

DETAILED DESCRIPTION OF THE PREFERRED EMBODIMENT

Figure 1:
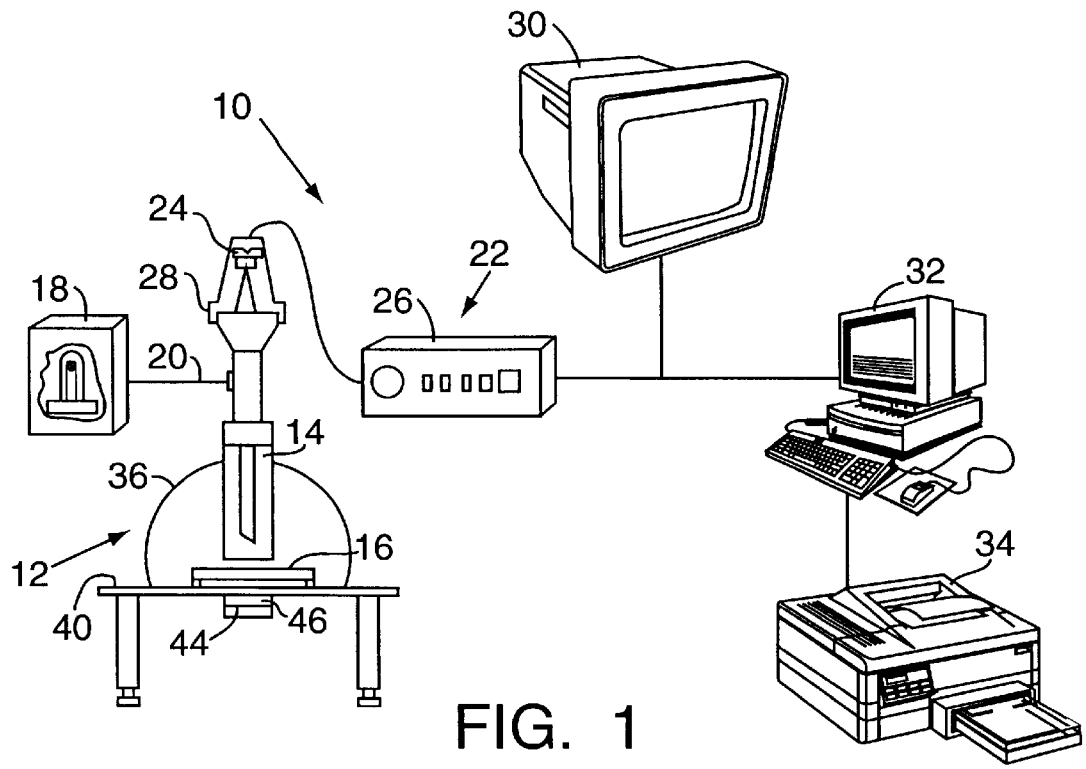
FIG. 1 is a schematic illustration of an apparatus for evaluating the optical performance characteristics of fiber optic endoscopes in accordance with the present invention.

In FIG. 1, an apparatus embodying the present invention for evaluating the optical performance of endoscopes is indicated generally by the reference numeral 10. The apparatus 10 comprises a test station 12 including an adjustable mounting arm 14 for receiving and retaining an endoscope to be tested, and a carrier 16 for positioning a selected target under the distal end (tip) of the endoscope for performing a respective test.

A variable, high-intensity light source 18, such as a xenon arc lamp or a halogen bulb, delivers light along a fiber optic cable 20 which is detachably connected to the endoscope through an aperture situated near its proximal end. In the currently preferred embodiment, the light source 18 is a variable xenon short-arc lamp, such as the 150 watt lamp sold under model no. 610 by Karl Storz Endoscopy-America Inc. of Culver City, Calif. As is described further below, during certain tests the fiber optic cable 20 is detached from the endoscope and re-positioned to directly illuminate a target on the carrier 16. The test station 12 and the position of the fiber optic cable 20 during each of the tests performed on a typical endoscope are described in detail below.

A video system 22 generates signals indicative of the image which is projected through the eyepiece at the proximal end of the endoscope. In the preferred embodiment, the video system 22 comprises a charge-coupled device (CCD) video camera 24 coupled to the eyepiece and a video signal processor 26 coupled to the camera. As is known in the art, the CCD video camera records an image by storing charges in a plurality of semiconductor potential wells, thereby defining a two-dimensional array of charges which each correspond to the intensity at a point in the transmitted image. The video signal processor 26 transfers the charges out of the wells and thereby generates time-varying video signals indicative of the recorded image. The CCD video camera 24 is coupled to the endoscope eyepiece with an adjustable vice 28 having a lens system with both zoom and focus control rings. Thus, the projected image may be properly zoomed and focused through the vice lens system 28 before it is recorded by the camera 24.

Figure 11:
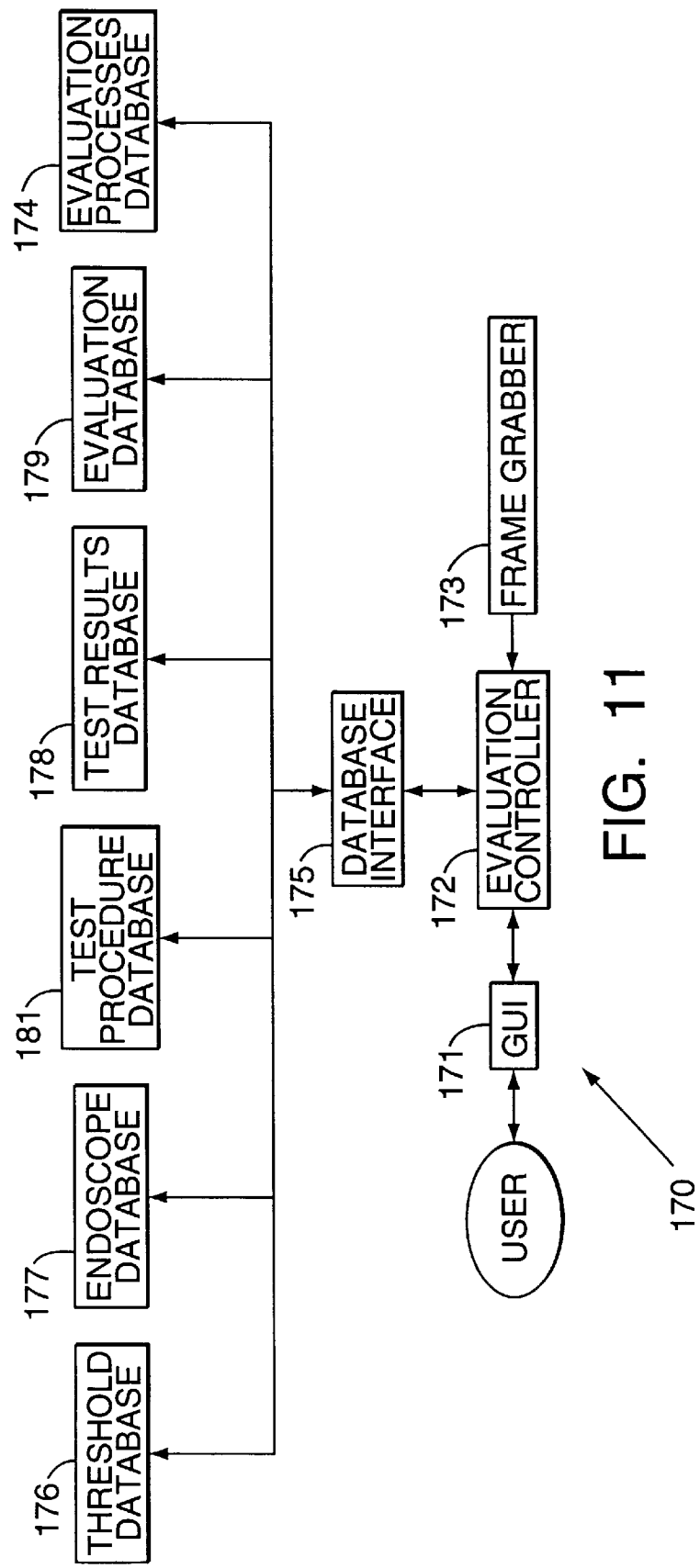
FIG. 11 is a schematic illustration of the software components of the computer of the apparatus of FIG. 1 configured for evaluating the optical performance characteristics of fiber optic endoscopes.

The video system 22 transmits the signals indicative of the image through a BNC connector to a standard video monitor 30 which displays the image, and to a desktop computer 32 which processes the signals in accordance with the present invention, as is described further below. In the currently-preferred embodiment, the computer 32 is an Intel Pentium™ microprocessor-based desktop computer which includes known computer software and peripheral devices as is necessary for its operation, such as an operating system, a keyboard, a hard disk, random access memory (RAM), a computer monitor and a mouse. As is described further below, the computer 32 further includes a frame grabber card (item 171 of FIG. 11), which is an analog-to-digital converter for receiving the image signals from the video system 22 and generating in dependence thereon digital signals indicative of the image. The frame grabber card thus translates the image signals from the format of the video system 22 to a digital format which the computer's microprocessor can accept and manipulate. The digital signals generated by the frame grabber card are preferably in the format of a 512 by 512 array of pixel intensities, and thus the number of pixels generated by the card is approximately determined as follows: 512×512=262,144 pixels.

The frame grabber card is preferably a "plug-in card" which is detachably connected to the system bus of the computer 32 in a known manner. The frame grabber card may be implemented with an "RT Mono"™ video capture board, sold by Digital Vision, Inc. of Dedham, Mass., and driver software sold by ViewPoint Solutions of Rochester, N.Y. for providing an interface between the video capture board and the standard Pentium™-based computer. Alternatively, the frame grabber card may be implemented with an IMAC PCI-1408 video capture board, sold by National Instruments of Austin, Tex. IMAQ Vision software and NI-IMAQ driver software, also sold by National Instruments, may provide the interface between the IMAC PCI-1408 video capture board and the standard Pentium™-based desktop computer.

The computer 32 is coupled in a known manner to a standard printer 34 for printing images processed by the computer. In the preferred embodiment, the printer 34 is a laser printer having a resolution of at least about 600 dots per inch (dpi).

Figure 2:
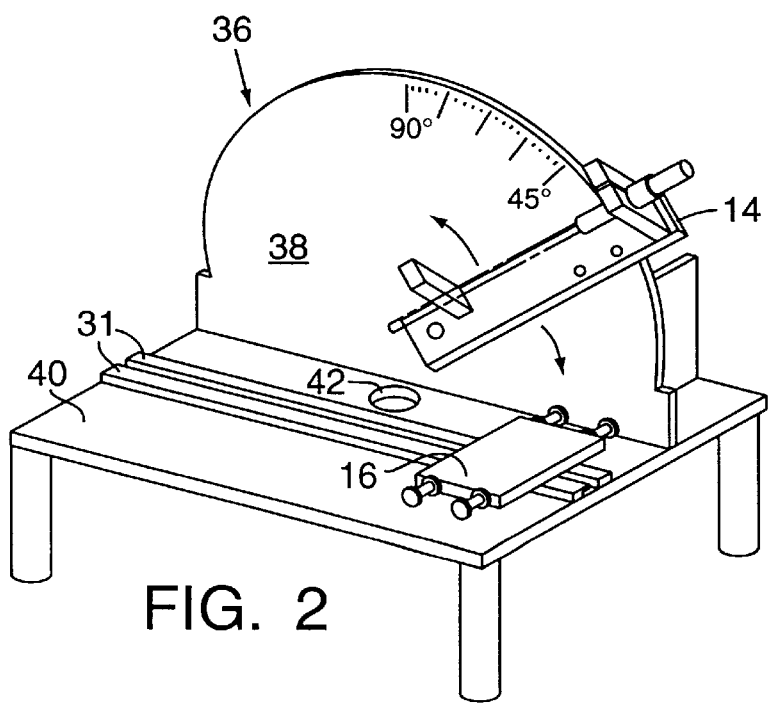
FIG. 2 is a perspective view of a test station of the apparatus of FIG. 1 for accommodating endoscopes of differing optical and physical characteristics, such as differing tip angles, lengths and diameters, and with parts removed for clarity.

Turning to FIG. 2, the test station 12 comprises a frame 36 including an upstanding arm support 38, and a carrier support 40 defining a horizontal support surface. As indicated by the arrows in FIG. 2, the mounting arm 14 is pivotally coupled to the arm support 38 and the angular position of the arm is adjustable relative to the carrier support 40 in order to accommodate endoscopes of all possible tip angles. In the preferred embodiment, the mounting arm 14 accepts endoscopes having outer diameters within the range of approximately 1.9 through 10.0 millimeters, lengths within range of approximately 4 inches through 13 inches, and tip angles within the range of approximately 0 degrees through 120 degrees.

As shown in FIG. 2, the carrier 16 is mounted on the carrier support 40 adjacent to the mounting arm 14 and is moveable relative to the mounting arm along rails 31 in order to adjust the position of the carrier relative to an endoscope on the mounting arm. As is described further below, the carrier 16 includes a plurality of targets, each for performing a respective test to evaluate the optical performance of the endoscopes. The carrier support 40 defines an aperture 42 extending through the support surface immediately below the base of the mounting arm. In the preferred embodiment of the test station, the aperture 42 is approximately circular and defines a diameter of approximately 1.9 inches.

As shown schematically in FIG. 1, directly beneath the aperture 42 and fixed to the underside of the carrier support 40 is a fiber optic cable holder 44 of a type known to those of ordinary skill in the pertinent art. The cable holder 44 receives and retains the fiber optic cable 20 in order to transmit a beam of light from the light source 18 through the aperture 42 to the distal end or tip of an endoscope being tested. A collimating lens 46 is fixed to the underside of the carrier support 40 and covers the aperture 42 in order to collimate the light beam projected through the aperture.

Figure 3:
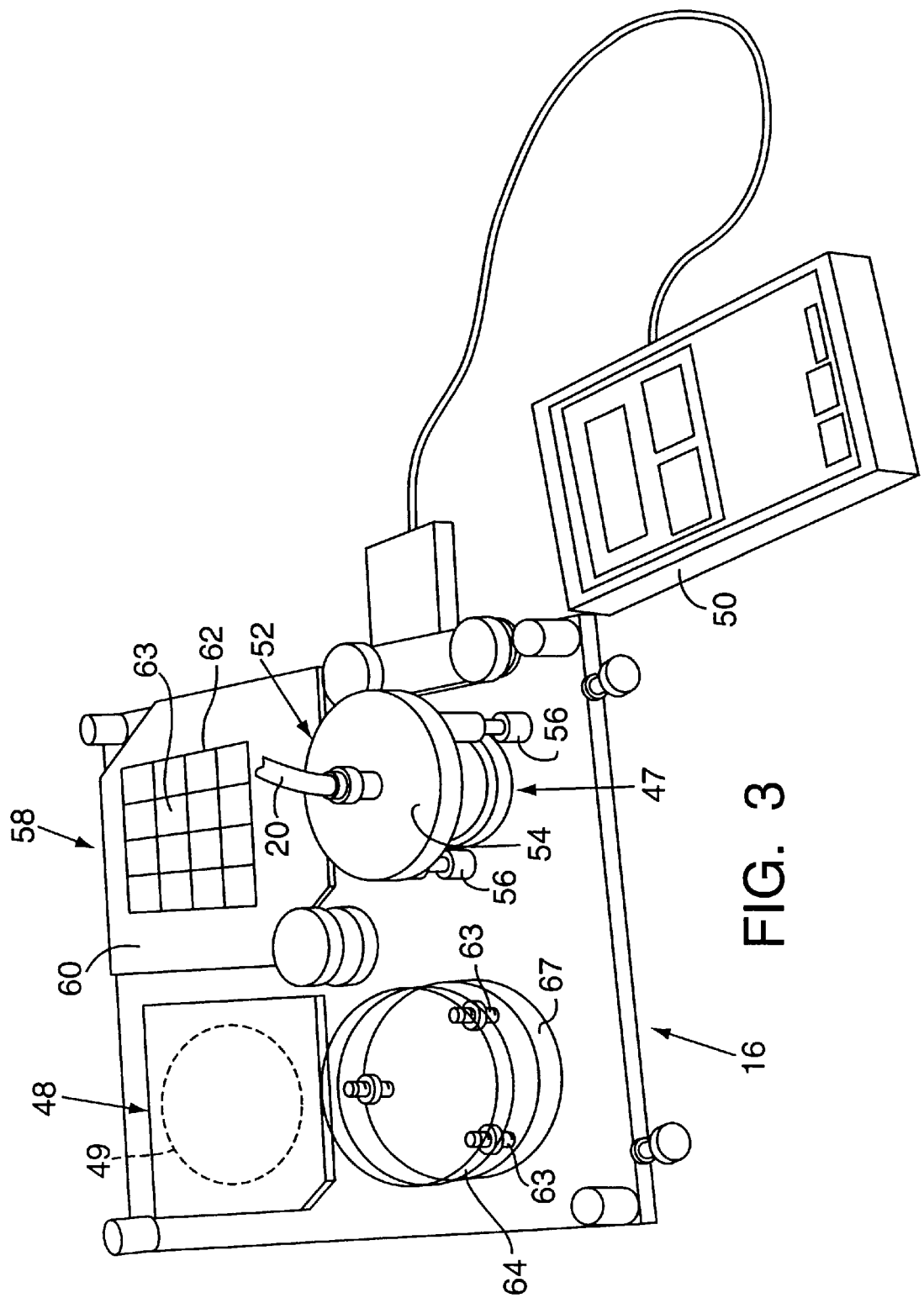
FIG. 3 is a perspective view of the carrier of the test station of FIG. 2 and the associated targets for performing the light loss, reflective symmetry, geometric distortion, lighted fibers and modulation transfer function (MTF) tests on the endoscopes.

As illustrated in FIG. 3, in the preferred embodiment there are four targets mounted on the carrier 16, each of which is used in at least one of five tests for evaluating the performance of the endoscope and described in detail below. The term "target" is used herein to broadly describe any of the various devices used for receiving and/or reflecting a transmitted beam as part of one of the tests for evaluating the performance characteristics of the endoscopes, as is described further below.

The first target 47 is a photometer sensor which is coupled to a photometer 50 for measuring the intensity of light received by the sensor. A fixture 52 including a base 54 and three upstanding legs 56 is removably mounted above the photometer sensor 47 for detachably connecting the fiber optic cable 20 to the base in order to illuminate the sensor. As described in the above-mentioned co-pending patent application, the upstanding legs 56 define a predetermined length so that the distance between the base 54 and the sensor 50, and thus the distance between the end of the fiber optic cable 20 and the sensor, is approximately equal to the distance between the photometer sensor and the distal end of an endoscope supported on the mounting arm. In the currently-preferred embodiment, this predetermined distance is approximately two inches.

The second target 58, which is used in two tests in the preferred embodiment, defines a nonspecular reflective surface 60, such as a Kodak R27, 90% reflectance card or a white sheet of paper. As is known in the art, a nonspecular reflective surface like the surface 60 is one which does not form a mirror-like reflected image, but rather diffuses the reflected light. A transparent film 62 having a printed reference pattern 63 is overlaid on the reflective surface 60 during at least one test. The reference pattern 63 printed on the transparent film 62 defines a number of reference points having a predetermined separation distance. As shown is FIG. 3, the reference pattern is preferably a black, rectangular grid defining two sets of parallel lines spaced approximately 0.2 inches apart, wherein each of the first set of lines is perpendicular to each of the second set of lines. The reference pattern thus defines a set of squares having approximately 0.2 inch sides.

The third target 64 defines a substantially mirror-like surface 65, and is preferably a circular reflector plate formed of a material having a reflectance preferably within the range of approximately 5% and approximately 40% reflectance, such as Lucite™, which is laid over a black background to provide the mirror-like quality. The surface 65 thus creates a specular (mirror-like) reflection. The reflectance of the surface 65 is selected to minimize the reflection of incident light, and thereby maintain the intensity of the light reflected back through any damaged fibers below a predetermined intensity level. As is described below, damaged fibers may be identified by their inability to transmit light having an intensity below a predetermined level. The substantially mirror-like surface 65 rests on three adjustable legs 63, allowing precise control over the separation between the endoscope tip and the reflective surface.

The fourth target is a semi-transparent medium 48, such as a film, and defines a transmittance which varies periodically along a predetermined direction within the medium. A beam of light which is filtered through the semi-transparent medium 48 will therefore have an intensity which varies periodically along the predetermined direction within the beam. In the preferred embodiment, the semi-transparent medium 48 has a transmittance which varies sinusoidally along the semi-transparent medium in a first direction, and which is substantially constant along the medium in a second direction transverse to the first direction. Also in the preferred embodiment, the sinusoidally-varying transmittance of the medium defines a spatial frequency of one cycle per millimeter (cycles per unit length), and is preferably of the type sold by Sine Patterns, Inc. of Penfield, N.Y.

TEST PERFORMANCE

As indicated above, the following five tests are preferably performed with the apparatus of the invention in order to evaluate both the optical fibers and lens system of an endoscope: (i) light loss test, (ii) reflective symmetry test, (iii) lighted fibers test, (iv) geometric distortion test, and (v) MTF test. The details of each test, along with the preferred methods for analyzing the results of these tests to thereby evaluate the performance characteristics of the endoscopes, are hereinafter described.

FIG. 4 illustrates a flow chart 66 for performing the first test (light loss test) which is directed to measuring the reduction in the intensity of light after transmission through an endoscope. In general, the test comprises measuring two quantities: the intensity of light which exits the fiber optic cable ("light in") and the intensity of light which exits the fiber optic cable and is transmitted through the endoscope ("light out").

In performing the light loss test, the light source 18 (FIG. 1) is activated (step 68), set to a selected intensity level, and preferably left active for a predetermined period of time in order to allow the light source to reach the selected intensity level. In the preferred embodiment, the predetermined intensity level is determined such that the intensity of light transmitted through the endoscope is within the preferred operating range of the photometer sensor target 54, and the predetermined period of time is at least approximately ten minutes. The free end of the fiber optic cable 20 (FIG. 1) is then coupled to the fixture 52 (FIG. 3) and thereby spaced a predetermined distance above the photometer sensor target 47 (which is approximately equal to the distance between the tip end of the selected endoscope supported on the mounting arm and the target) to thereby illuminate the sensor (step 70). The photometer intensity reading is then recorded and designated "light in" (step 72).

After the "light in" intensity is recorded, the cable 20 is removed from the carrier fixture 52 (FIG. 3) and attached to the proximal end of the endoscope supported on the mounting arm 14 (step 74), as indicated in FIG. 1. The angular position of the mounting arm 14 is adjusted relative to the photometer sensor target 47 to correspond to the actual tip angle of the endoscope tested. The position of the carrier 16 is also adjusted so that the photometer sensor target 47 is positioned directly underneath, or aligned with the endoscope tip and spaced the predetermined distance (approximately two inches) from the endoscope tip (step 76). In the final step of the light loss test, the photometer intensity reading is recorded (step 78), and this intensity reading is designated the "light out". Both the "light in" and "light out" readings are recorded and used, as described below, in measuring the reduction in the intensity of light after transmission through the endoscope.

FIG. 5 illustrates a flow chart 80 for performing the second test (reflective symmetry test) which is directed to measuring the reflective symmetry of light which exits the eyepiece of the endoscope. When an ideal endoscope transmits an image of uniform intensity from its tip end to its proximal end, the transmitted image is approximately circularly symmetrical about the center of the transmitted image. Thus, the intensity in the center of the transmitted image is greatest, and the intensity decreases at locations in the transmitted image spaced radially from the center. All points which are equally distant from the center of the transmitted image have approximately equal intensities, and the intensity at the periphery of the transmitted image is lowest. In actual (nonideal) endoscopes, deviation from the circular symmetry of the transmitted image indicates damaged optical fibers.

In performing the reflective symmetry test, the light source 18 (FIG. 1) is activated (step 82) and set to a selected intensity level. In the preferred embodiment, the predetermined intensity level is determined such that the intensity of light transmitted through the endoscope is within the preferred operating range of the video system 22 (FIG. 1). The fiber optic cable 20 (FIG. 1) is attached to the endoscope supported on the mounting arm (step 84), and the carrier is positioned so that the second target, the reflective surface 65, is positioned directly underneath, or aligned with the endoscope tip (step 86). The video system 22 is then focused on the reflective surface 65 (step 88). A preferred method for focusing the video system is to overlay a reference pattern film, such as the transparent film 62 (FIG. 3), on the reflective surface 65, set the adjustable vice 28 connecting the video system 22 (FIG. 1) to the endoscope to its maximum zoom setting, and then adjust the focus ring of the vice to bring the reference pattern into focus. Once the video system 22 is focused, the reference pattern film 62 is removed from the reflective surface 65.

As discussed above, the center of the transmitted image should have the highest intensity. However, if the endoscope is not oriented properly (i.e. if the tip angle is not substantially equal to the angle of the mounting arm), the point of highest intensity in the transmitted image will not coincide with the center of the transmitted image. Accordingly, if necessary, the angular position of the mounting arm must be adjusted until the approximate center of the transmitted image has the highest intensity (step 90). Unfortunately, endoscope tip angles are generally not held to a tight tolerance, and thus the proper angle of the mounting arm generally cannot be set based only on the purported (nominal) tip angle of the endoscope.

A preferred method for orienting the endoscope is to adjust the angle of the mounting arm 14 while the video system 22 displays the transmitted image on the video monitor 30 (FIG. 1) or on a computer monitor of the computer system 32 (FIG. 1). In this manner, a human operator can adjust the mounting arm 14 by viewing the transmitted image on the monitor and simultaneously moving the arm until the center of the transmitted image coincides with the point of highest intensity.

Once the endoscope is properly oriented, the frame grabber card stores the transmitted image and generates digital signals indicative of the image (step 92). It is preferable that the frame grabber card have an adjustable range of intensities which it can accept and translate to digital format. It is most preferable that in each test the frame grabber card generates signals indicative of white pixels for the highest intensities in the stored image, and signals indicative of black pixels for the lowest intensities in the stored image. In this manner, the frame grabber card produces pixels having intensities which span approximately the entire output range of the card, which in turn improves resolution and facilitates evaluation of the test results. The computer system 32 processes the digital signals (pixels) when evaluating the endoscope, as described further below.

FIG. 6 illustrates a flow chart 100 for performing the third test (lighted fibers test) which is directed to measuring the ability of the endoscope optical fibers to transmit low-intensity light. The light source 18 (FIG. 1) is activated (step 102) and set to a selected intensity level. In the preferred embodiment, the predetermined intensity level is determined such that the intensity of light transmitted through the endoscope is within the preferred operating range of the video system 22 (FIG. 1). The fiber optic cable 20 (FIG. 1) is attached to the proximal end of the endoscope supported on the mounting arm (step 104), and the carrier is positioned so that the third target defining the substantially mirror-like surface 65 is positioned directly underneath, or aligned with the endoscope tip at a relatively close distance selected to produce a focused, specular reflection of the lighted optical fibers at the endoscope eyepiece (step 106). This distance is typically less than approximately 0.25 inches. The frame grabber card stores the transmitted image and generates digital signals indicative of the image (step 108) which the computer 32 processes when evaluating the image data.

Figure 7:
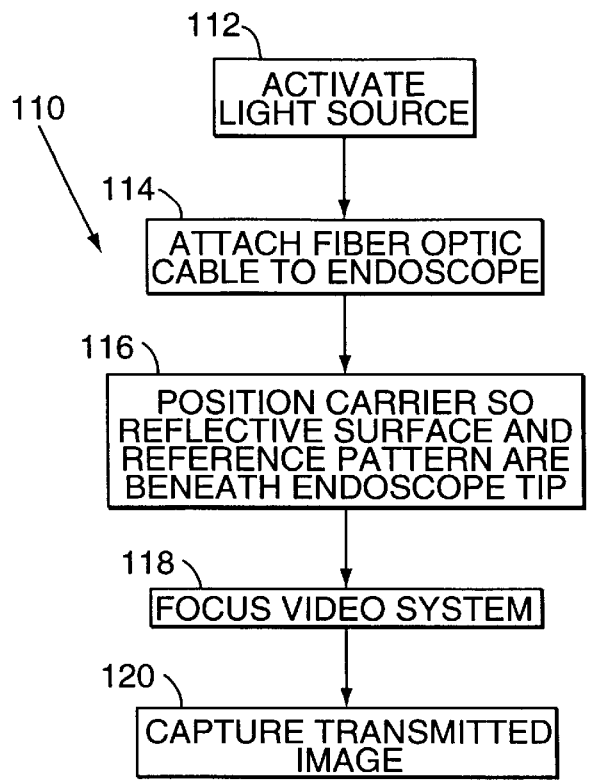
FIG. 7 is a flow chart illustrating conceptually the procedural steps for performing a geometric distortion test on the endoscopes in the apparatus of FIG. 1.

FIG. 7 illustrates a flow chart 110 for performing the fourth test (geometric distortion test) which is directed to measuring the degree to which the endoscope geometrically distorts an image. Distortion at a point in the transmitted image is defined as the ratio of the magnification at that point to the magnification at the center of the transmitted image. A preferred method for measuring distortion is to transmit through the endoscope an image of a plurality of equally-sized squares, and to then measure and compare the diagonal lengths of the corresponding squares in the transmitted image.

The light source 18 (FIG. 1) is activated (step 112) and set to a selected intensity level. In the preferred embodiment, the predetermined intensity level is determined such that the intensity of light transmitted through the endoscope is within the preferred operating range of the video system 22 (FIG. 1). The fiber optic cable 20 (FIG. 1) is attached to the proximal end of the endoscope supported on the mounting arm (step 114), and the carrier is positioned so that the second target 58 defining the reflective surface 60 is positioned directly underneath, or aligned with the endoscope tip (step 116). In addition, the transparent film 62 with the reference pattern 63 is overlaid on the reflective surface 60 and the video system 22 is then focused on the pattern (step 118). A preferred method of focusing the video system 22 is to set the adjustable vice 28 to maximum zoom, and to then adjust the focus ring of the vice to bring the reference pattern into focus. Once the video system 22 is focused, the frame grabber card stores the transmitted image and generates digital signals indicative of the image (step 120). The computer 32 processes the digital signals when evaluating the endoscope, as is described further below.

Figure 8:
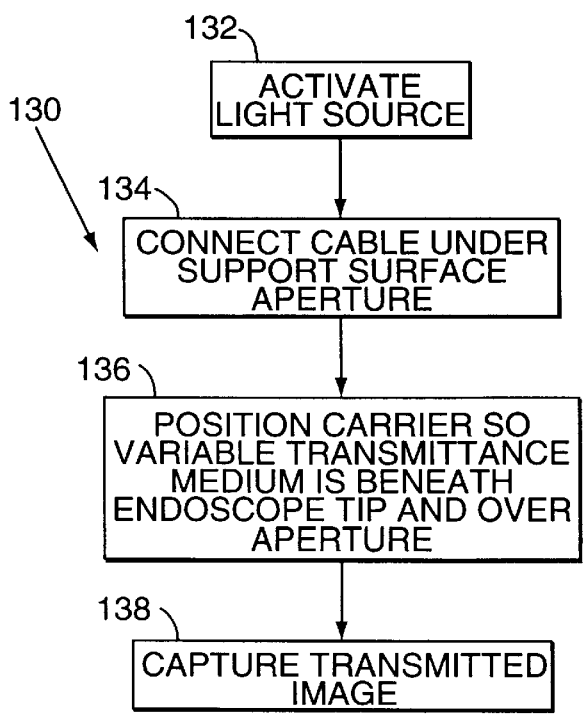
FIG. 8 is a flow chart illustrating conceptually the procedural steps for performing a MTF test on endoscopes in the apparatus of FIG. 1.

FIG. 8 illustrates a flow chart 130 for performing the fifth test (MTF test) which is directed to measuring the modulation transfer function (MTF) of the endoscope at a predetermined spatial frequency, and which is equivalent to measuring the modulation transfer ratio (MTR) of the endoscope while it transmits an image having an intensity which varies along a direction at the predetermined spatial frequency.

An image's modulation is correlated with the contrast (sharpness) of the image. The modulation at a location in an image is defined by the maximum intensity and the minimum intensity at that location as follows:

modulation=(maximum intensity−minimum intensity)÷(maximum intensity+minimum intensity)

As used herein, the terms "maximum intensity" and "minimum intensity" refer to the local maxima and minima, respectively, of a cycle in the periodically-varying intensity.

Figure 9:
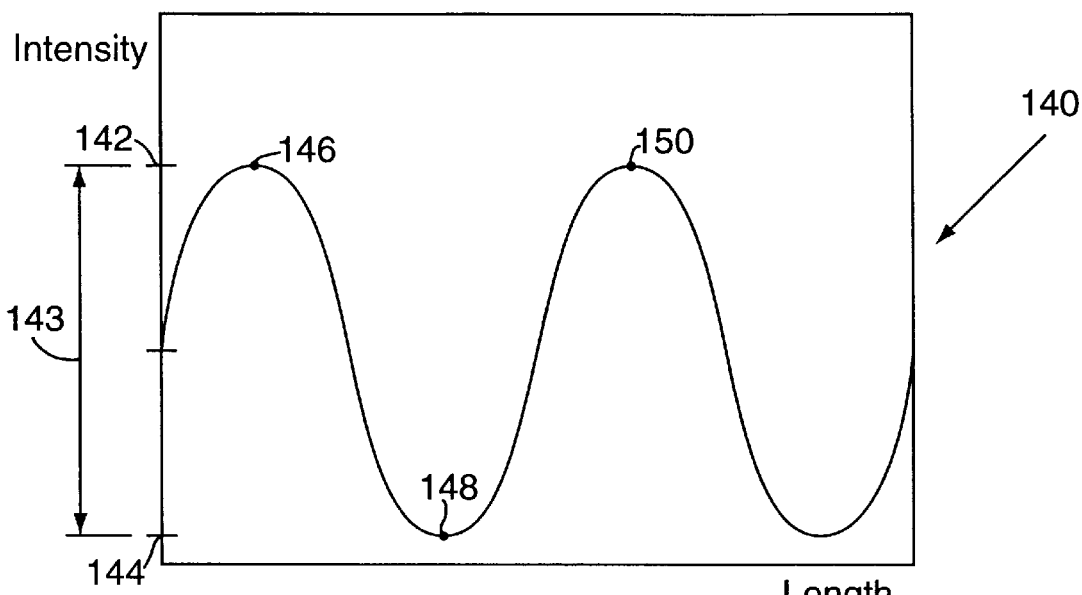
FIG. 9 is an exemplary graph illustrating the intensity of a light beam generated by the light source of the apparatus of FIG. 1 before transmission through an exemplary endoscope.
Figure 10:
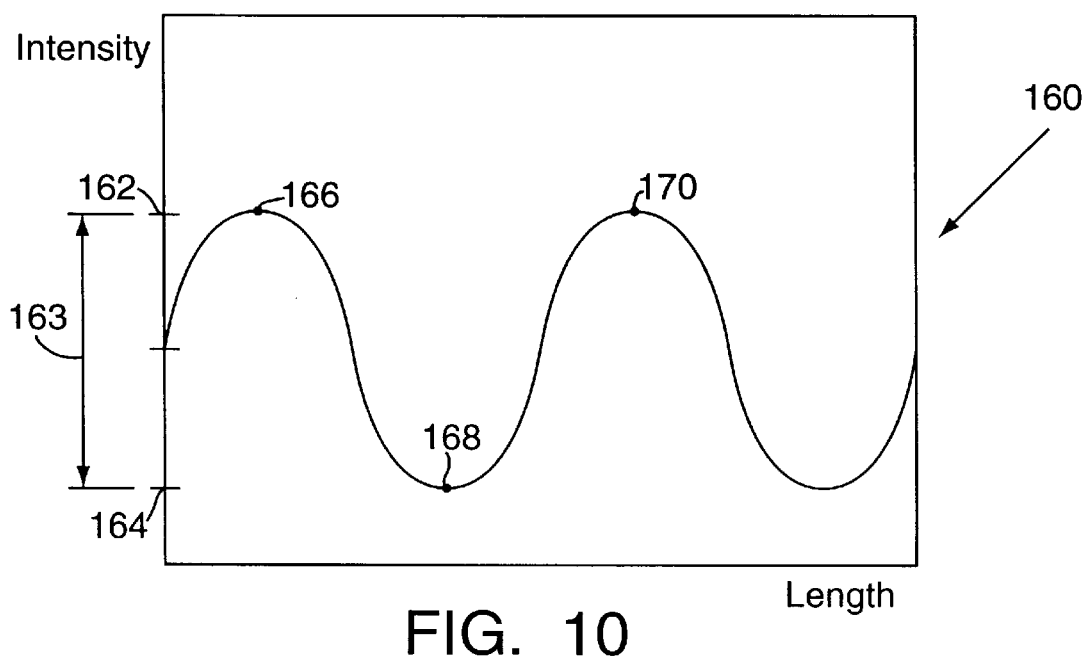
FIG. 10 is an exemplary graph illustrating the intensity of a light beam generated by the light source of the apparatus of FIG. 1 after transmission through an exemplary endoscope.

An endoscope reduces the modulation of a transmitted image, so that the transmitted image is not as sharp as the image received at the endoscope tip. The MTR is a measure of the change in an image's modulation after transmission through the endoscope, and is defined as follows:

MTR=modulation of image after transmission÷modulation of image before transmission FIGS. 9 and 10 illustrate the maximum and minimum intensities in an image before and after transmission through an endoscope, respectively. The graph 140 in FIG. 9 represents the sinusoidally-varying intensity of an image which is received at the endoscope tip (i.e. before transmission through the endoscope). Points 146 and 150 have a maximal intensity 142, while a point 148 has a minimal intensity 144. The intensity variation 143 in the image before transmission is the difference between the maximal intensity 142 and the minimal intensity 144.

The graph 160 in FIG. 10 represents the sinusoidally-varying intensity of an image after transmission through the endoscope. Points 166 and 170 have a maximal intensity 162, while a point 168 has a minimal intensity 164. The points 166, 168 and 170 of the transmitted image (FIG. 10) correspond respectively to the points 146, 148 and 150 of the received image (FIG. 9). The intensity variation 163 in the image after transmission is the difference between the maximal intensity 162 and the minimal intensity 164.

The intensity variation 163 in the image after transmission is less than the intensity variation 143 in the image before transmission. In other words, transmission through the endoscope reduces the sharpness of the image. The MTF test is directed to measuring this reduction in sharpness at different locations in the transmitted image.

Referring again to FIG. 8, in performing the MTF test, the light source 18 (FIG. 1) is activated (step 132) and set to a selected intensity level. In the preferred embodiment, the predetermined intensity level is determined such that the intensity of light transmitted through the endoscope is within the preferred operating range of the video system 22 (FIG. 1). The free end of the fiber optic cable 20 (FIG. 1) is attached to the fiber optic cable holder 44 (FIG. 1) mounted below the aperture 42 of the carrier support 40 (step 134), in order to transmit a light beam through the aperture. The carrier 16 is then positioned so that the fourth target, the semi-transparent medium 48, is positioned directly underneath the endoscope tip and above the carrier support aperture 42 (step 136), thereby filtering the beam projected from the fiber optic cable and transmitting the filtered beam through the endoscope. The frame grabber card stores the transmitted image and generates digital signals indicative of the image (step 138).

In summary, each of the tests described above are preferably performed on each endoscope in order to provide test results comprising a set of signals indicative of intensities at predetermined locations in a beam of light transmitted through the endoscope. As hereinafter described, the system of the invention generates a second set of signals responsive to the test result signals which is indicative of the performance characteristics of the endoscope. The manner in which the second set of signals is generated depends on the particular test used to generate the corresponding test result signals.

TEST RESULT EVALUATION

For each of the above-described tests, the computer system 32 (FIG. 1) receives the signals indicative of the beam intensities, and generates the second set of signals in accordance with the intensity signals and further in accordance with signals indicative of the test type.

FIG. 10 illustrates the control system 170 of the endoscope evaluation system provided in accordance with the invention, and which comprises software components of the computer system 32. A graphical user interface (GUI) 171 provides the means by which a user interacts with the control system 170. As is known in the art, the GUI 171 provides both a means for user input and a means for the computer system to display information. The GUI 171 also provides signals indicative of the type of test, typically in accordance with user commands such as the actuation of graphical buttons and switches. In the preferred embodiment, the GUI 171 is implemented using LabVIEW® software sold by National Instruments of Austin, Tex. Accordingly, the various types of displays and input methods of the GUI described herein are those which are most easily implemented with LabVIEW® software. However, those skilled in the art will recognize that other types of displays and input methods may be implemented, including other forms of graphical, textual and audio input and output.

An evaluation controller 172 receives the test signals indicative of the transmitted beam intensities from the frame grabber 173. As described above, the test signals are used by the computer system 32 to generate signals indicative of one or more performance characteristics of the endoscope. Specifically, the evaluation controller 172 generates the signals indicative of the performance characteristics of an endoscope in accordance with the test signals received from the frame grabber 173 and the signals received from the GUI 171 indicating the test type. The signals indicative of the type of test are preferably the result of graphical button actuations.

The evaluation controller 172 processes the test signals in accordance with signals indicative of evaluation processes which are stored in a database 174. The evaluation controller 172 receives signals indicative of the steps in the evaluation process (i.e., the evaluation algorithm) from a database 174 through a database interface 175. The evaluation processes for the different endoscope tests are described in detail below. The evaluation controller further receives from a threshold database 176 signals indicative of thresholds used in the evaluation process, and described in detail below. A final set of signals used in the evaluation of test signals is provided by an endoscope database 177 of information for each endoscope tested, including, for example, a unique identifier for the endoscope, the endoscope manufacturer, diameter, length, tip angle, any reported and observed problems with the endoscope, the time and date of testing, and the reason for testing. As described herein, this information may be profitably used in evaluating endoscope test results.

The test results and evaluation results are stored in databases 178 and 179, respectively. These stored results and evaluations are useful in determining, for example, how the performance characteristics of a particular endoscope changes over its lifetime, particularly after repair operations. Stored test results and evaluations for a number of endoscopes is also useful in assessing the tolerance of performance in a given endoscope model. For example, a number of endoscopes of the same model may be evaluated, and those evaluations may be stored in the database. These stored evaluations for endoscopes of the same model type describe the degree to which a performance characteristic of a typical endoscope of that model may vary. It is advantageous to identify an endoscope model which has very little variation from its purported performance rating. Similarly, it is advantageous to identify an endoscope model which typically varies greatly from its purported performance rating.

In a preferred embodiment, the control system 170 further includes a database 181 of test procedure instructions. Such instructions are used in training the user to properly conduct tests by allowing the user to practice those tests and receive from the GUI 171 an indication of whether the tests were performed properly, and if not, how to properly conduct the tests.

The above-described databases can be implemented with a variety of commercial software products, such as Microsoft Access™ or Claris FileMaker Pro™. Alternatively, as is also known to those skilled in the art, custom software may be developed to store the database information.

Figure 12:
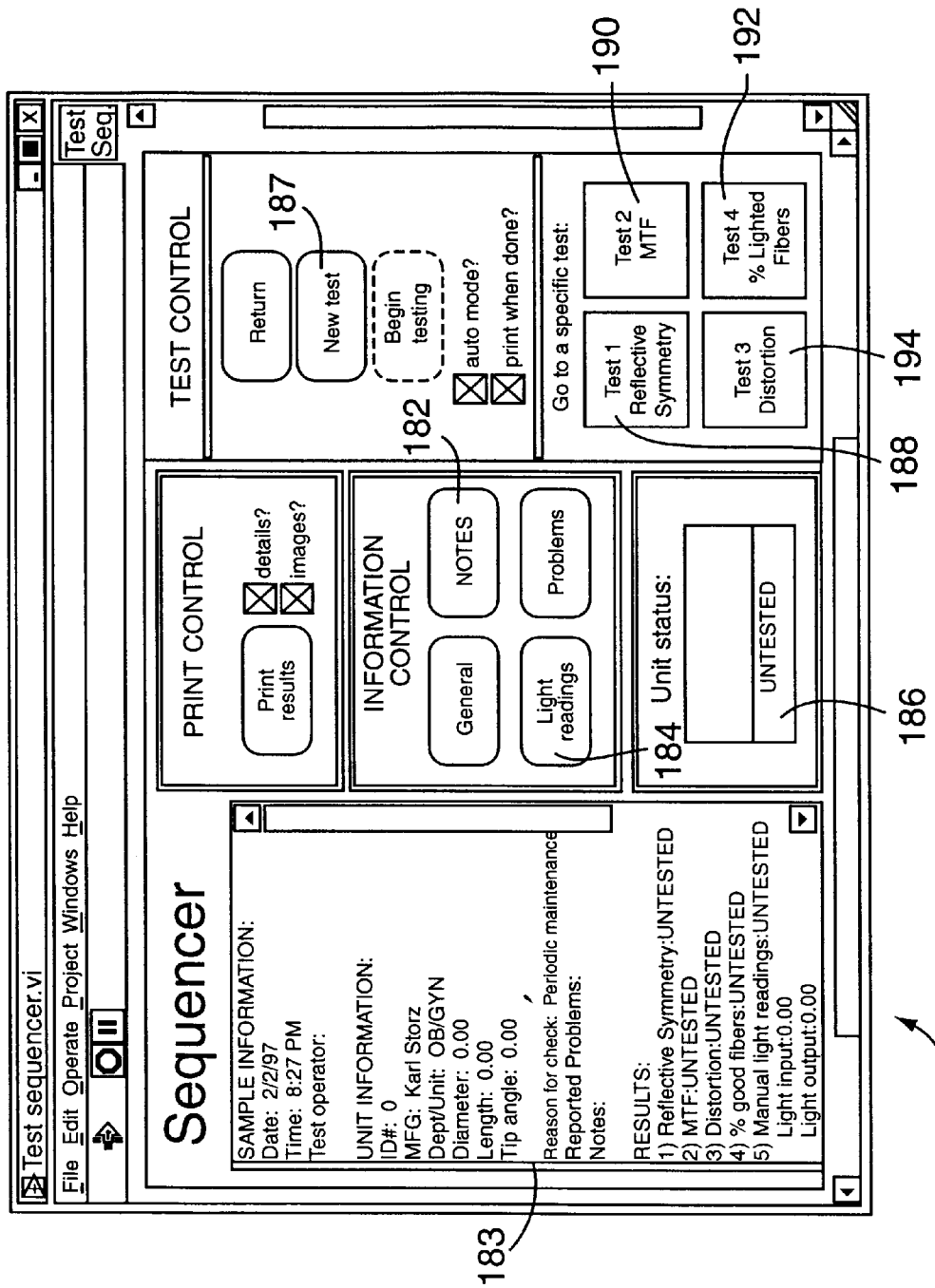
FIG. 12 is an exemplary display of a graphical user interface provided by the computer of the apparatus of FIG. 1 illustrating a selection of tests that may be performed on an endoscope in accordance with the invention.

FIG. 12 shows an exemplary display 180 of the graphical user interface (GUI) 171 (FIG. 11) generated and displayed on the monitor of the computer system 32. The display 180 includes graphical "buttons" which the user actuates via mouse or keyboard actions in a manner known in the art. Upon actuation of a notes button 182, the GUI provides a second display (not shown) into which the user may enter information related to the endoscope being tested and reflected in the display region 183. As indicated in FIG. 12, this information includes the endoscope identification code ("ID#"), manufacturer ("MFG"), diameter, length, tip angle, any reported and observed problems with the endoscope, and the results of the five tests performed in accordance with the invention. Further types of information may be included without departing from the scope of the invention.

A graphical indicator 186 displays a message which indicates whether the endoscope supported on the mounting arm is untested, has passed a test, or has failed a test. Actuation of a button 187 signals that a new endoscope is to be evaluated, and that previously stored test results are therefore inapplicable to this endoscope. Accordingly, upon actuation of the button 187, the graphical indicator 186 displays a message indicating that the endoscope is untested.

Figure 13:
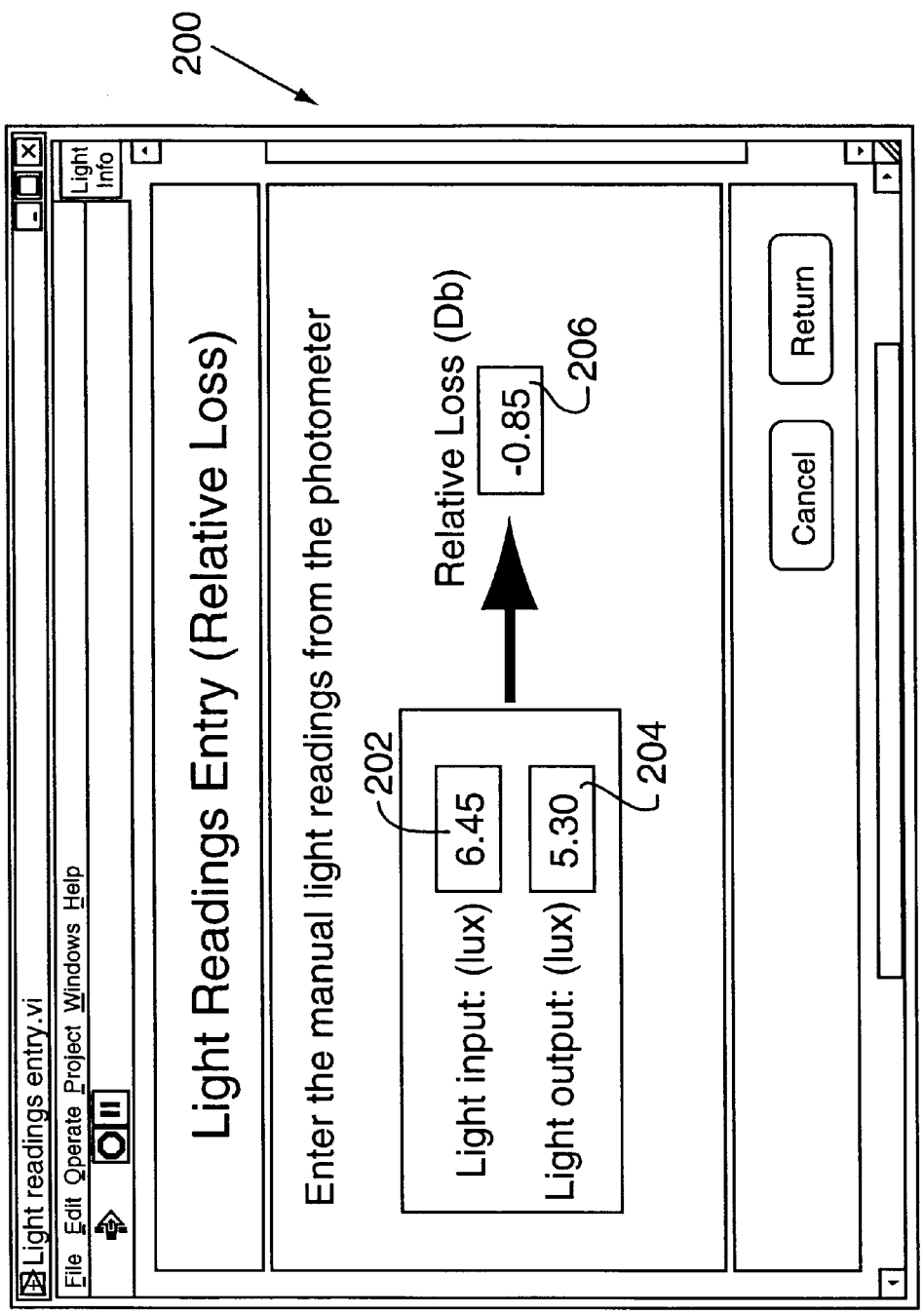
FIG. 13 is an exemplary display of a graphical user interface provided by the computer of FIG. 1 for evaluating the results of a light loss test.

Actuation of a button 184 provides a third display 200 shown in FIG. 13. The display 200 facilitates analysis of the results of the light loss test. As described above, performing the light loss test yields signals indicative of a Light-In and a Light-Out measurement from the photometer sensor 47. The ratio of these two intensities yields the light loss of the tested endoscope in units of Optical decibels (dB Optical) in accordance with the following relationship:

Light Loss=10 log (Light-Out/Light-In)

The user provides the Light-In reading in a text entry region 202 and the Light-Out reading in another text entry region 204. Upon entry of valid numerical values in both text entry regions 202 and 204, the evaluation controller 172 generates signals indicative of the entered readings, and in turn generates signals indicative of the Light Loss in accordance with the above relationship. Finally, the GUI 171 displays a textual indication of the Light Loss in a display region 206.

The displayed Light Loss allows the user to compare the endoscope under test with average or expected Light Loss values, which generally depend on the diameter of the endoscope. Typical values for Light Loss are about (−6±3) dB Optical for a 10 millimeter diameter endoscope, and about (−16±3) dB Optical for endoscopes with diameters between 2 and 4 millimeters.

Referring again to FIG. 12, actuation of the buttons 188, 190, 192 and 194 initiates analyses of the results of the reflective symmetry test, MTF test, lighted fibers test and geometric distortion test, respectively. The analyses of the results of these four tests are directed generally to generating signals which are indicative of the degree to which the tested endoscope attenuates the intensity of the transmitted beam at predetermined locations within the beam.

Figure 14:
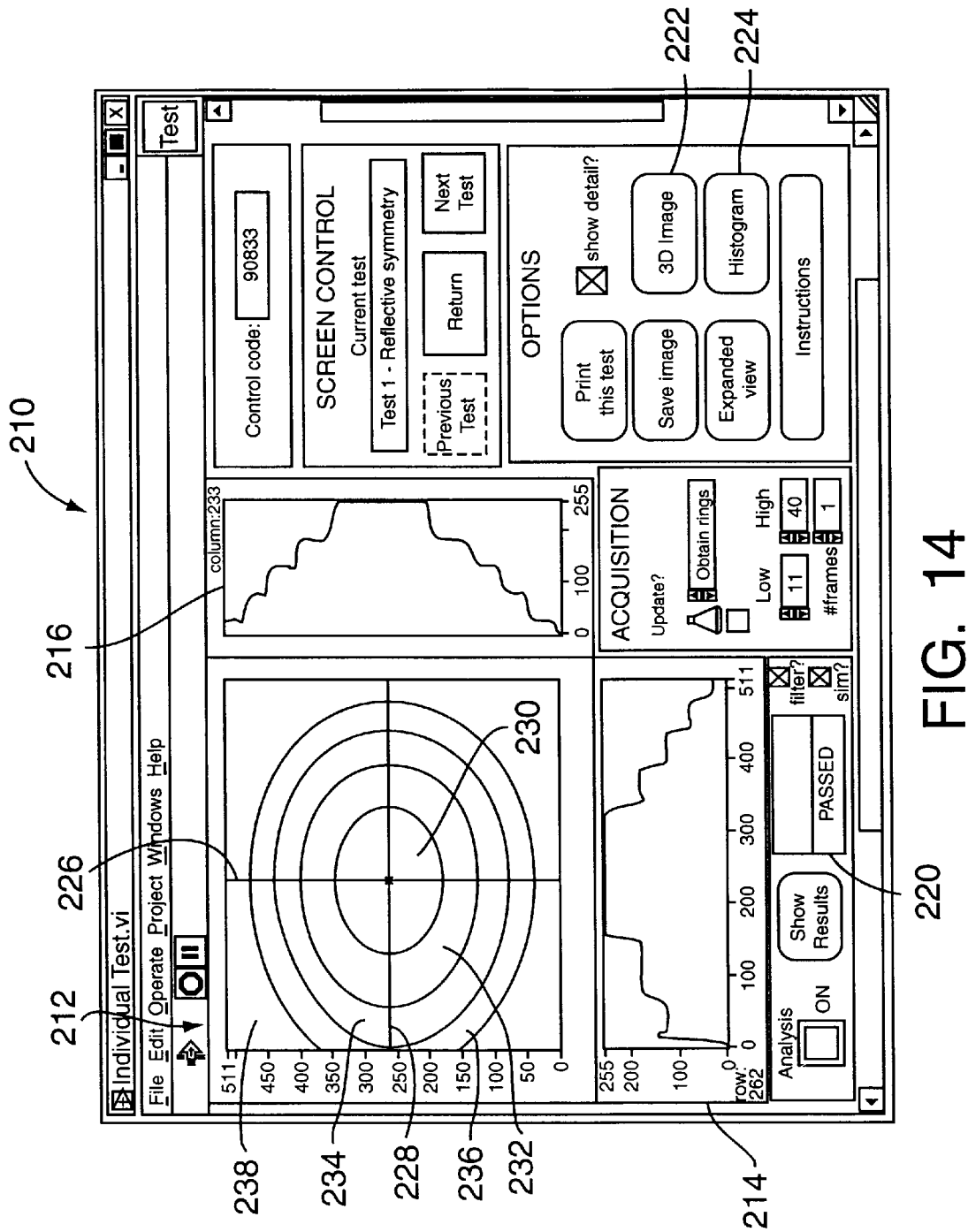
FIG. 14 is an exemplary display of a graphical user interface provided by the computer of FIG. 1 for evaluating the results of a reflective symmetry test.

Actuation of the button 188 initiates analysis of the results of the reflective symmetry test, and causes the GUI 171 (FIG. 11) to provide the display of a type indicated by the reference numeral 210 of FIG. 14. The display 210 includes a region 212 showing a graphical display of an intensity pattern of the transmitted beam. In the preferred embodiment, the region 212 defines a two-dimensional array of pixels, and each pixel has a color (e.g., a shade of gray) indicating the intensity of the transmitted beam at a location in the beam corresponding to the location of the pixel. Also in the preferred embodiment, a substantially white pixel indicates a location in the beam with the highest intensity relative to all pixels, while a substantially black pixel indicates a location in the beam with the lowest intensity relative to all pixels.

As shown in FIG. 12, the region 212 defines a plurality of approximately concentric regions, each defining a respective intensity range and corresponding to a respective region within the transmitted beam. In the preferred embodiment, the intensity of a respective concentric region is indicated by the shade of that region. The lighter the shade, the higher is the intensity of the region; and the darker the shade, the lower is the intensity of the region.

Referring to the exemplary graphical image shown in the region 212 of FIG. 14, this region defines an approximately oval central region 230, three approximately concentric annular regions 232, 234 and 236 progressively spaced outwardly from the central region in the radial direction, and a peripheral region 238 surrounding the outermost annular region 236. The central region 230 contains pixels which are white, and thus defines the region within the beam of highest intensity. Typically, the pixels spaced radially outwardly from the central region 230 define progressively darker shades, and the pixels at the peripheral region 238 of the display are substantially black because they correspond to the periphery of the transmitted beam defining the lowest intensity. Although the exemplary graphical image shown in the region 212 defines five regions 230, 232, 234, 236 and 238, and thus the region 212 indicates five intensity ranges, those skilled in the art will recognize that a number of intensity ranges different than the five shown may be used without departing from the scope of the invention.

The region 212 further includes a vertical indicator bar 226 and a horizontal indicator bar 228 which may be moved horizontally and vertically, respectively, within the region 212 by appropriate user command (e.g. a mouse action or keyboard key press). Each bar 226 and 228 defines a plurality of collinear pixels in the display and, thus, corresponds to a plurality of approximately collinear locations within the transmitted beam.

The display 210 further includes a vertical cross-section display region 216 showing a graphical display indicative of the intensity of the transmitted beam in the approximately collinear locations defined by the vertical bar 226 of the region 212. The intensity curve shown in the region 216 is formed by a plurality of pixels each having a vertical position corresponding to the vertical position of a pixel in the region 212 along the vertical bar 226, and a horizontal position corresponding to the intensity of that pixel. The scale at the base of the vertical cross-section display region 216 facilitates in visually assessing the relative intensities of the concentric regions.

Similarly, the display 210 further includes a horizontal cross-section display region 214 showing a graphical display indicative of the intensity of the transmitted beam in the approximately collinear locations defined by the horizontal bar 228 of the region 212. The intensity curve shown is formed by a plurality of pixels each having a horizontal position corresponding to the horizontal position of a pixel in the region 212 along the horizontal bar 228, and a vertical position corresponding to the intensity of that pixel. The vertical scale of the cross-section display 214 facilitates in visually assessing the relative intensities of the regions of the beam, and the horizontal scale provides the corresponding pixels (0 through 511) in the respective pixel row displayed (e.g., as indicated in the lower left corner of the region, row 262 is displayed).

Figure 15:
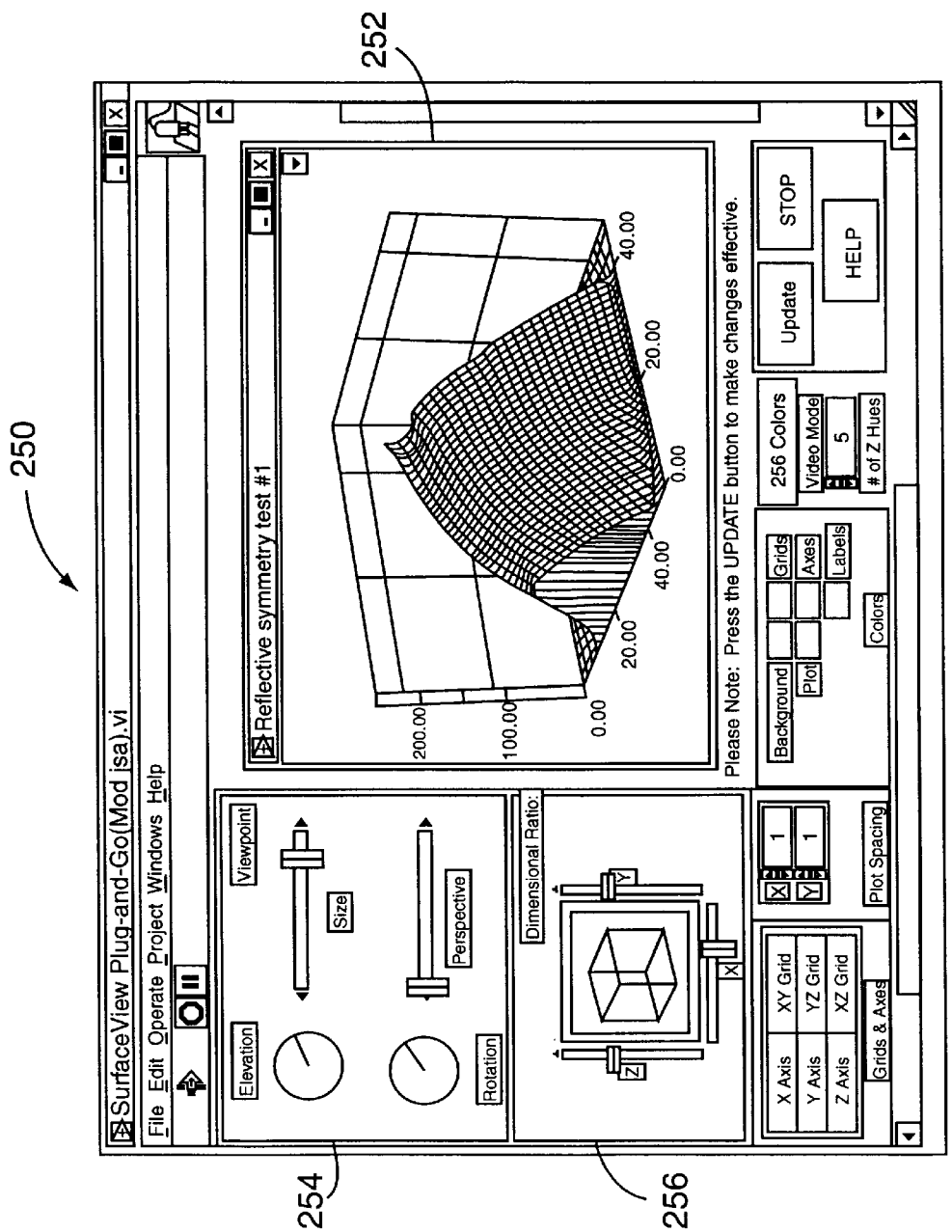
FIG. 15 is another exemplary display of a graphical user interface provided by the computer of FIG. 1 for evaluating the results of a reflective symmetry test.

Upon actuation of a button 222 on the display 210, a display 250 of the type shown in FIG. 15 is generated which includes a display region 252 comprising a three-dimensional image indicative of the intensity pattern of the transmitted beam and corresponding to the image of the region 212. A region 254 includes controls for adjusting the point-of-view of the three-dimensional image (e.g., elevation, rotation, perspective and size), and a region 256 includes controls for adjusting the scale of the three-dimensional image along three mutually-perpendicular directions (e.g., the x, y and z coordinate directions).

The three regions 212, 214 and 216 (FIG. 14) and the three-dimensional image (FIG. 15) each provide an indication of the degree to which the transmitted image is circularly symmetrical, and thus the degree to which the intensity of the transmitted beam is symmetrical (or non-symmetrical) about its center. A user may be able to evaluate an endoscope based on this type of graphical feedback alone, and determine whether or not the endoscope is acceptable. However, as discussed below, the computer system 32 of the invention further provides an explicit indication of whether the tested endoscope passes a threshold standard for the reflective symmetry test.

Figure 16:
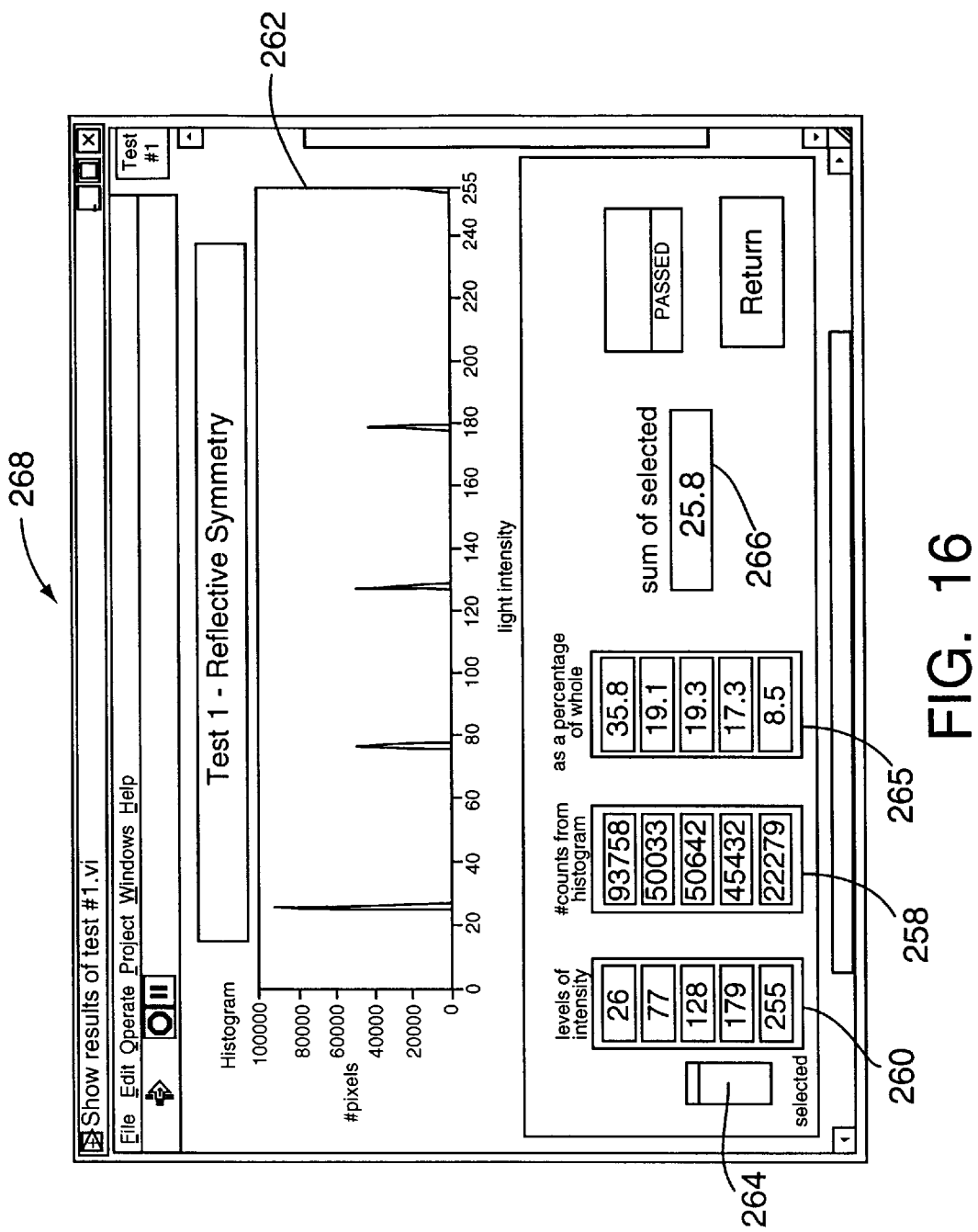
FIG. 16 is another exemplary display of a graphical user interface provided by the computer of FIG. 1 for evaluating the results of a reflective symmetry test.

Referring again to FIG. 14, upon actuation of a button 224 on the display 210, a display 268 of the type shown in FIG. 16 is generated. The display 268 indicates, for each of a plurality of intensity ranges, the number of pixels which correspond to that intensity. The display 268 includes a region 262 showing a histogram comprising a plurality of vertical bars with the relative light intensity indicated on the horizontal scale, and the number of pixels at each intensity on the vertical scale. A region 260 comprising a plurality of text entry areas allows the user to define each intensity range of the display region 226 (FIG. 14) by entering values defining the upper bound of each range. A region 258 provides a plurality of numerical values corresponding to the number of pixels included in each intensity range. And a region 265 provides a plurality of numerical values corresponding to the percentage of pixels included in each intensity range. Accordingly, the regions 258, 262 and 265 display substantially the same information in three different formats.

A selector 264 is set by the user to select one of the intensity ranges. A textual display 266 indicates the percentage of pixels having an intensity within or above the range indicated by the selector 264. For example, if the selector 264 is set to the second highest intensity range, the textual display 266 will indicate the percentage of pixels having an intensity included in either the second highest or highest intensity range.

A textual display 267 indicates whether the endoscope has passed the reflective symmetry test. A textual display 220 in FIG. 14 also indicates whether the endoscope has passed the reflective symmetry test. In accordance with the invention, an endoscope passes the reflective symmetry test if more than a predetermined percentage of pixels have an intensity greater than a predetermined or threshold intensity level. In the preferred embodiment, the predetermined percentage of pixels is approximately 30%, and the predetermined intensity is approximately 50% of the maximum possible pixel intensity, although these values may be changed using the display 268 in the manner set forth above. As discussed above, the intensity of a pixel corresponds to an intensity of a location in the transmitted beam, which itself is defined by the degree to which the endoscope attenuates the intensity at that location. Thus, it is equivalent to say that an endoscope passes the reflective symmetry test if more than a predetermined number of locations in the transmitted beam have been attenuated by less than a predetermined attenuation.

Figure 17:
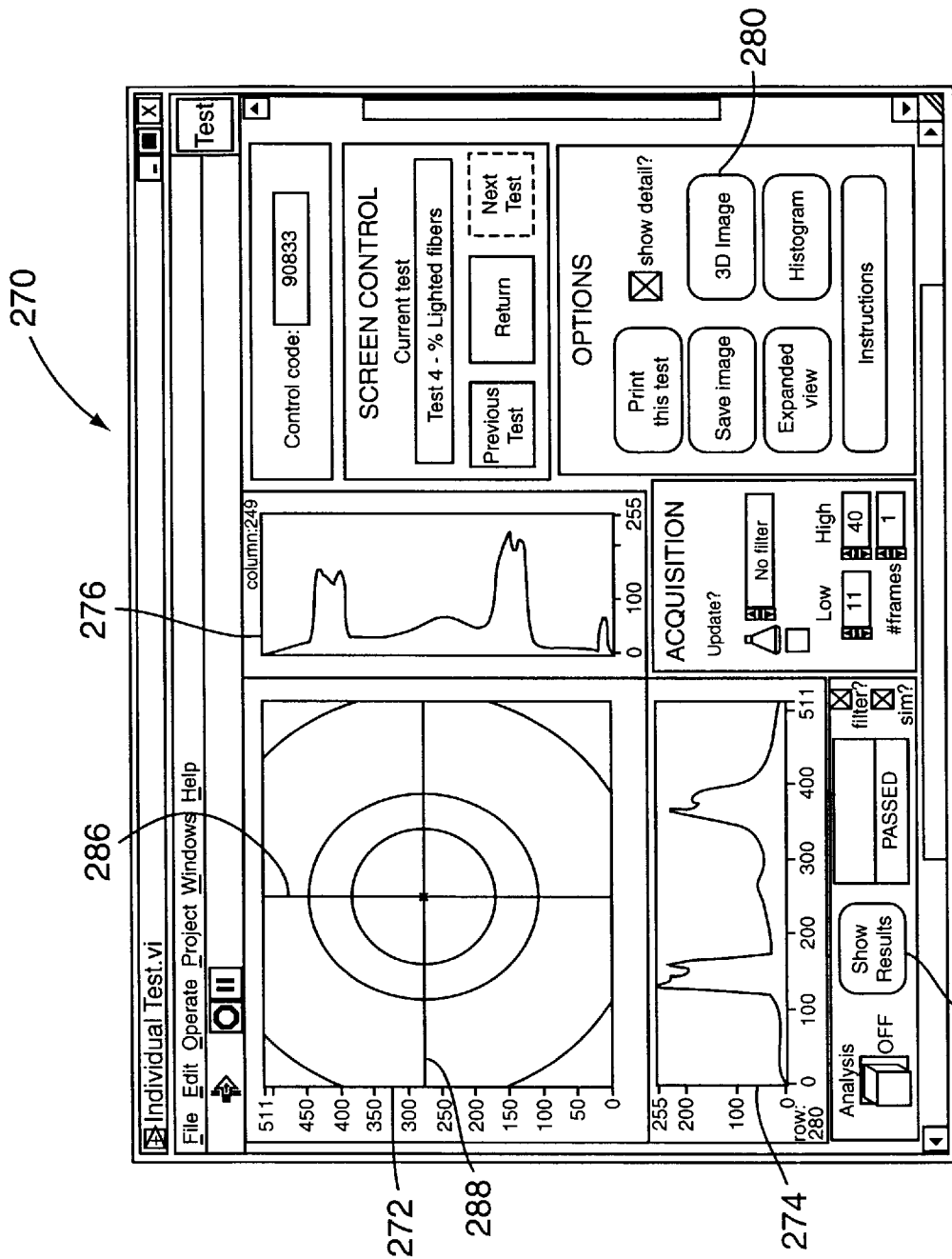
FIG. 17 is an exemplary display of a graphical user interface provided by the computer of FIG. 1 for evaluating the results of a lighted fibers test.

Referring again to FIG. 12, actuation of the button 192 initiates analysis of the results of the lighted fibers test, and a display 270 of the type shown in FIG. 17 is generated. The display 270 is substantially similar to the display 210 of FIG. 14 for analyzing the results of the reflective symmetry test. The display 270 includes a region 272 showing a graphical display indicative of the intensity pattern of the transmitted beam. The region 272 further includes a vertical indicator bar 286 and a horizontal indicator bar 288. As discussed above with reference to the display 210 of FIG. 14, the bars 286 and 288 each define a plurality of collinear pixels in the display and, therefore, a plurality of substantially collinear locations in the transmitted beam. The display 270 further includes a horizontal cross-section display region 274 corresponding to the horizontal bar 288 of the region 272 and showing the beam intensity at each point within the region along the horizontal bar, and a vertical cross-section display region 276 corresponding to the vertical bar 286 of the region 272 and showing the beam intensity at each point within the region along the vertical bar.

Figure 18:
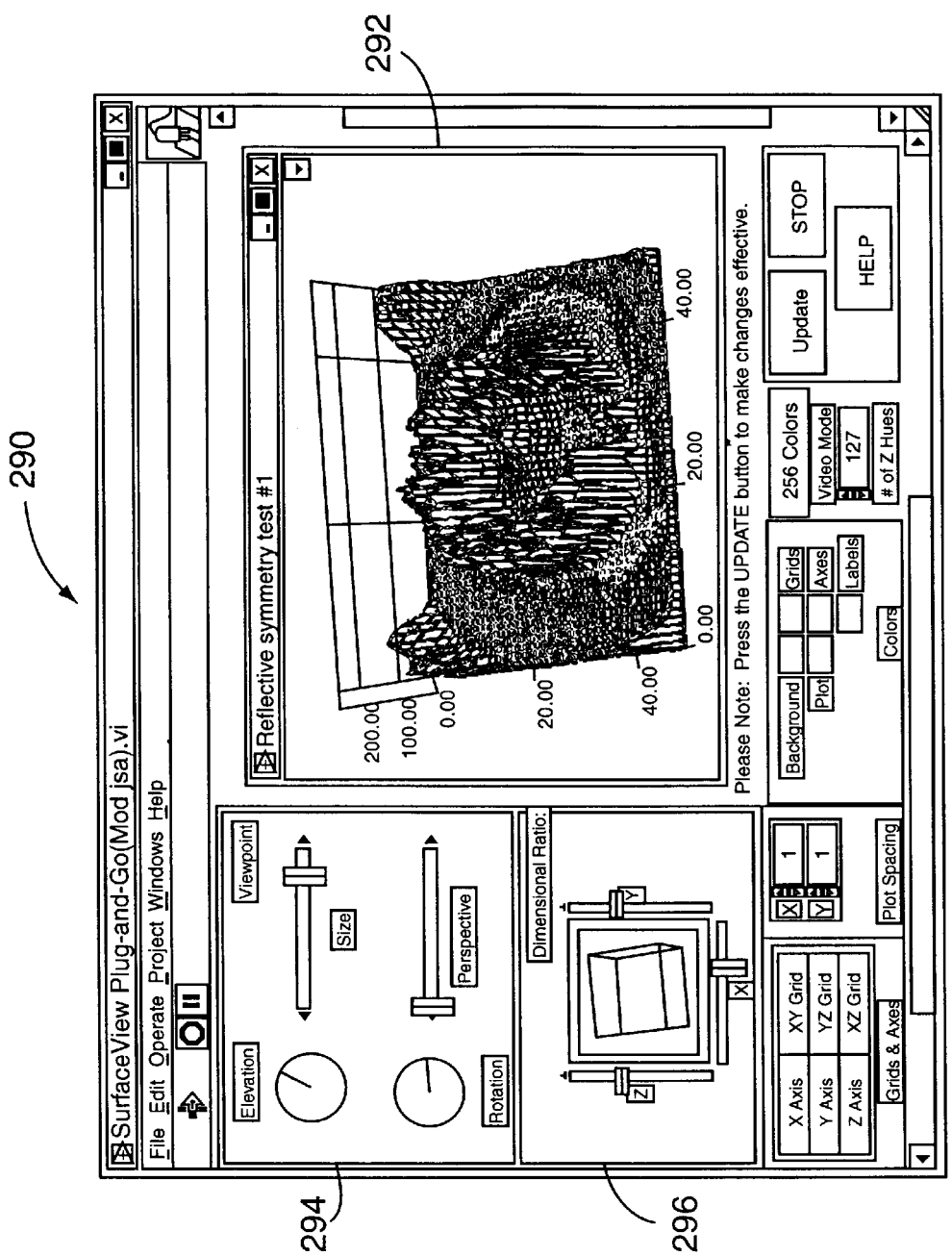
FIG. 18 is another exemplary display of a graphical user interface provided by the computer of FIG. 1 for evaluating the results of a lighted fibers test.

Upon actuation of a button 280 on the display 270, a display 290 of the type shown in FIG. 18 is generated which includes a display region 292 comprising a three-dimensional image indicative of the intensity pattern of the transmitted beam and corresponding to the image of the region 272 (FIG. 17). A region 294 includes controls for adjusting the point-of-view of the three-dimensional image (e.g., elevation, rotation, perspective and size), and a region 296 includes controls for adjusting the scale of the three-dimensional image along three mutually-perpendicular directions (e.g., the x, y and z coordinate directions).

The three-dimensional image 292 and the three display regions 272, 274 and 276 each provide an indication of the degree to which optical fibers in the endoscope are damaged and do not transmit light. A user may be able to evaluate the endoscope based on this type of graphical feedback alone, and determine whether or not the endoscope is acceptable. However, as discussed below, the computer system 32 of the present invention further provides an explicit indication of whether an endoscope being tested has passed the lighted fibers test.

Figure 19:
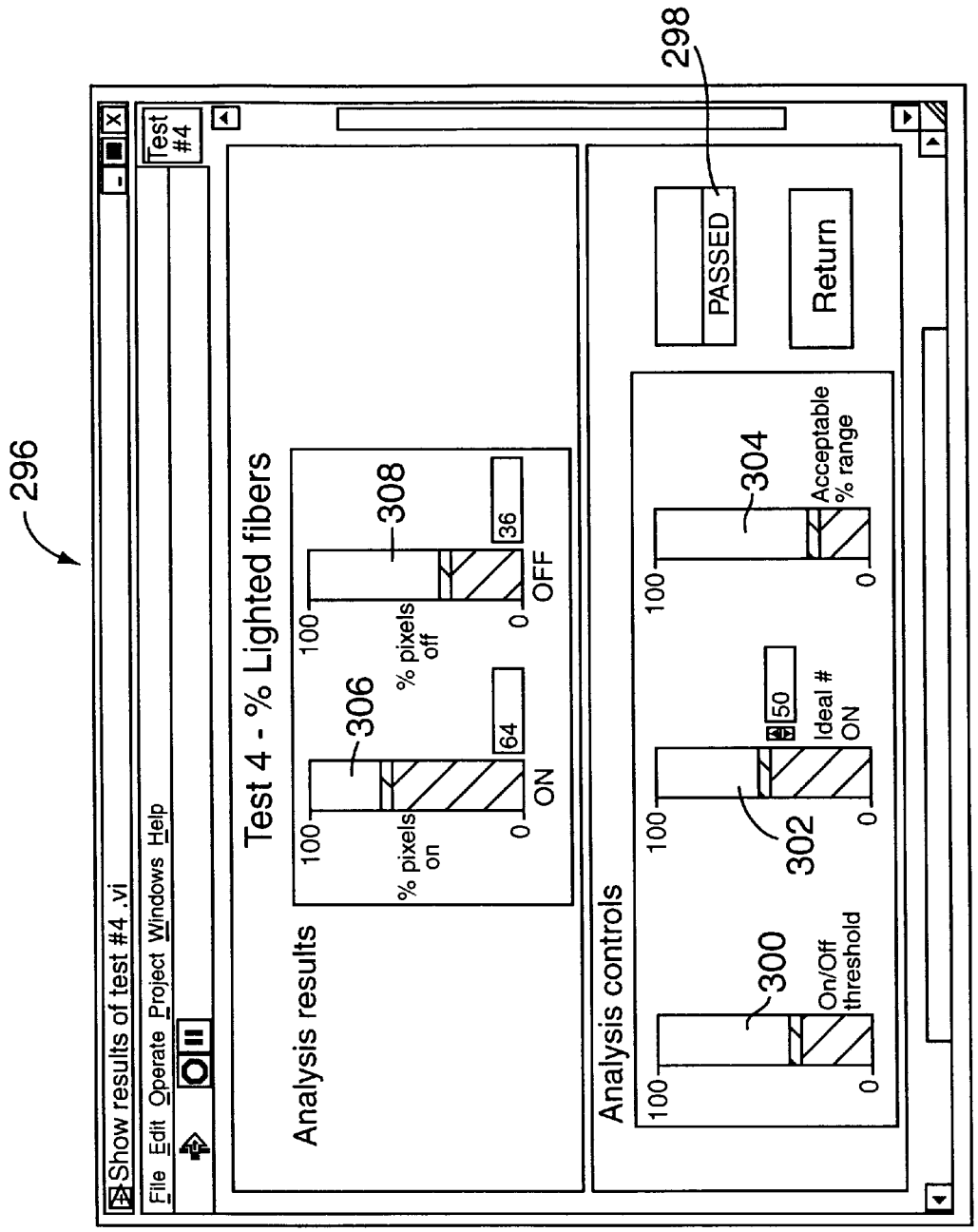
FIG. 19 is another exemplary display of a graphical user interface provided by the computer of FIG. 1 for evaluating the results of a lighted fibers test.

Upon actuation of a button 282 in the display 270 (FIG. 17), the GUI 171 provides a display 296 of the type shown in FIG. 19. The display 296 includes regions 306 and 308 which indicate, for each of a plurality of intensity ranges, the percentage of pixels which correspond to the respective intensity range. In the preferred embodiment, only two ranges are considered: intensities above a predetermined intensity ("on") and intensities equal to or below a predetermined intensity ("off"). As shown in FIG. 19, the percentages are displayed both graphically and numerically in the display regions 306 and 308. The display 296 also includes a selector 300 with which the user sets the predetermined intensity (the "ON/OFF" threshold).

The display 296 also includes a selector 302 with which the user selects a value corresponding to a minimum threshold number of pixels which are above the predetermined intensity ("Ideal # ON"). Another selector 304 allows the user to select an acceptable range on either side of the selected minimum threshold number of pixels. If the actual number of pixels which are "on" is within this selected range, the endoscope is considered to have passed the lighted fibers test, and the evaluation controller 172 generates signals accordingly. A textual display 298 indicates whether the results of the lighted fibers test indicate that the endoscope has passed. The display 270 (FIG. 17) also includes a textual display 278 which indicates whether the results of the lighted fibers test indicate that the endoscope has passed.

As discussed above, the intensity of a pixel corresponds to an intensity of a location in the transmitted beam. The number of working fibers in the endoscope, which is correlated with the number of white pixels in the display region 272 (FIG. 17), depends on such factors as the endoscope's dimensions, the tip angle and the number of damaged optical fibers. As is also discussed above, the beam intensity at each location is defined by the amount which the endoscope attenuates the intensity at that location. Thus, it is equivalent to say that an endoscope has passed the lighted fibers test if more than a predetermined number of locations in the transmitted beam have been attenuated by less than a predetermined attenuation.

In the preferred embodiment described above, the predetermined intensity, the minimum threshold number of pixels, and the range around the selected minimum threshold number of pixels have been described as values which the user may select. However, those skilled in the art will recognize that that such values may be fixed and not alterable by the user. Such an embodiment may be preferable if necessary to prevent the user from altering values which define preferred threshold values, or the preferred range for such values.

Figure 20:
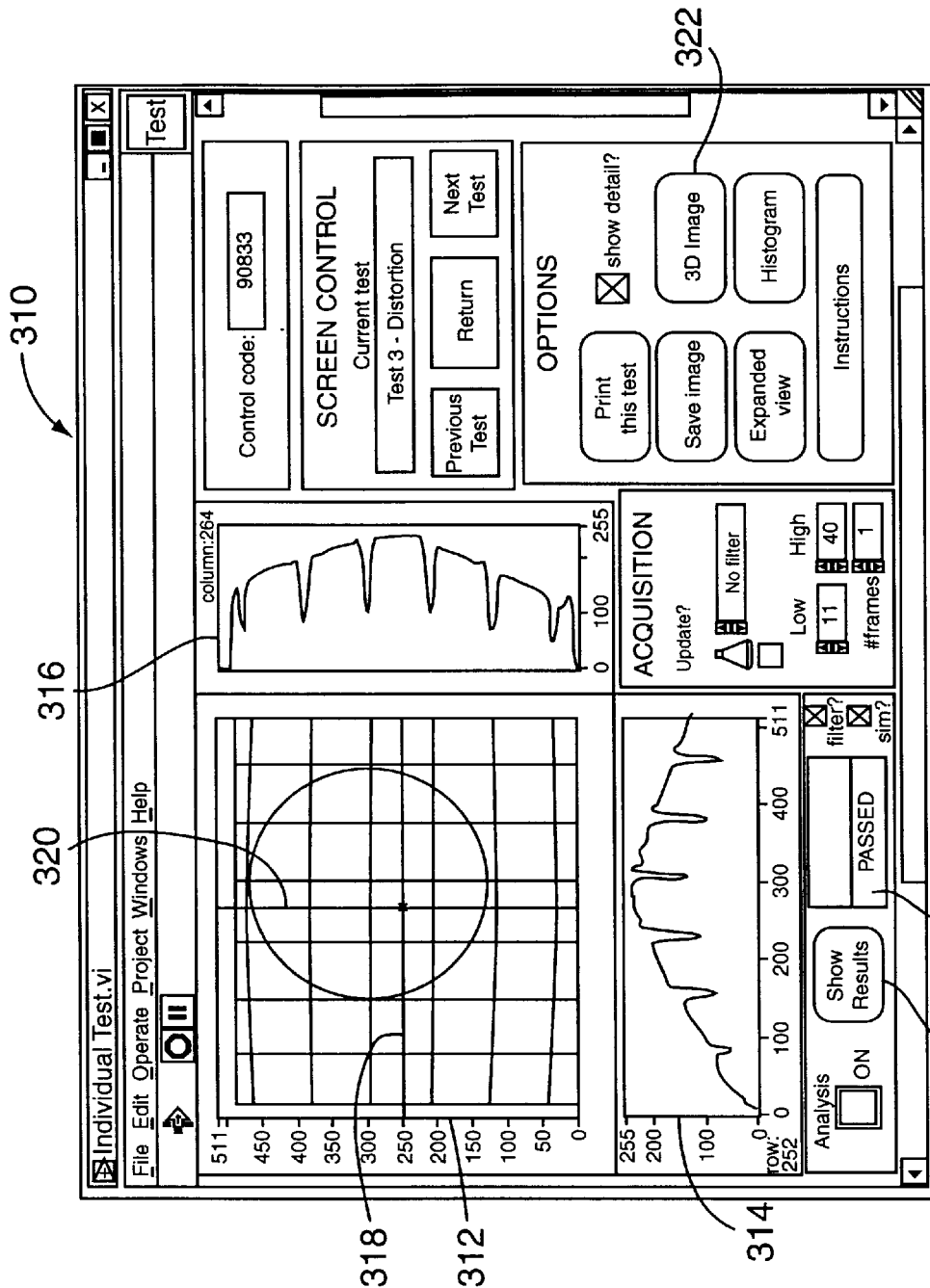
FIG. 20 is an exemplary display of a graphical user interface provided by the computer of FIG. 1 for evaluating the results of a geometric distortion test.

Referring again to FIG. 12, actuation of the button 194 initiates analysis of the results of the geometric distortion test, and causes the GUI 171 to provide the display 310 of the type shown in FIG. 20. The display 310 is substantially similar to the display 210 of FIG. 14 for analyzing the results of the reflective symmetry test, and includes a region 312 showing a graphical display indicative of an intensity pattern of the transmitted beam.

The region 312 further includes a vertical indicator bar 320 and a horizontal indicator bar 318 which may be moved horizontally and vertically, respectively, within the region 312 by appropriate user command. As discussed above with reference to the display 210 of FIG. 14, each of the bars 318 and 320 define a plurality of approximately collinear pixels in the display and, therefore, a plurality of substantially collinear locations in the transmitted beam. The display 310 further includes a horizontal cross-section display region 314 corresponding to the horizontal bar 318 of the region 312 and showing the beam intensity at each point within the region 314 along the horizontal bar, and a vertical cross-section display region 316 corresponding to the vertical bar 320 of the region 312 and showing the beam intensity at each point within the region 316 along the vertical bar.

The three-dimensional image 312 and the three regions 312, 314 and 316 each provide an indication of the degree to which the endoscope geometrically distorts the image at different locations in the transmitted beam. A user may be able to evaluate the endoscope based on this type of graphical feedback alone, and determine whether or not the endoscope is acceptable. However, as discussed below, the computer system 32 of the present invention further provides an explicit indication of whether an endoscope being tested has passed the geometric distortion test.

Figure 21:
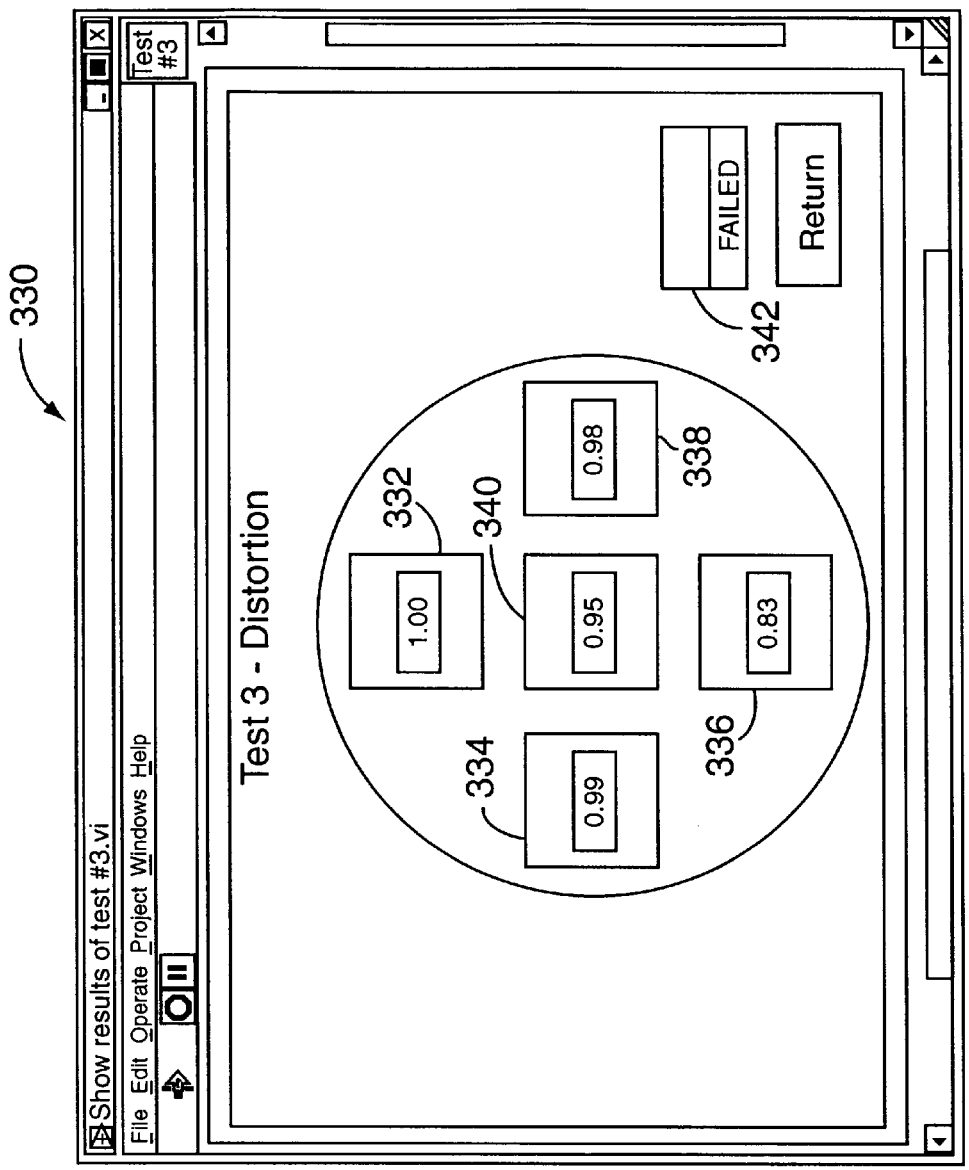
FIG. 21 is another exemplary display of a graphical user interface provided by the computer of FIG. 1 for evaluating the results of a geometric distortion test.

Upon actuation of a button 324 in the display 310, the GUI 171 provides a display 330 of the type shown in FIG. 21. The display 330 includes indicators 332, 334, 336, 338 and 340 which each indicate the degree of geometric distortion at a respective location within the transmitted beam. The degree of geometric distortion at each location is determined from the image of the reference pattern 63 forming a part of the transmitted image. As discussed above, the reference pattern 63 (FIG. 3) defines a set of equally-sized squares, and geometric distortion will cause the reference pattern in the transmitted image to define squares of different sizes or to otherwise distort the shape of one or more squares. Accordingly, the geometric distortion at a location is determined based on the length of the diagonal of the square at that location. In particular, the distortion value at a location is calculated in accordance with the following relationship:

Distortion=$(S_1/S_2)-1$ wherein $S_1$=the diagonal length of the square at the respective location; and $S_2$=the diagonal length of the central square.

Each of the indicators 332, 334, 336, 338 and 340 further indicates whether the results of the distortion calculation at the respective location indicates either a pass or fail condition. In the preferred embodiment, each distortion value is compared to a predetermined distortion threshold. Distortion values which are below the predetermined distortion threshold are considered "fail" values. If at least one of the plurality of distortion values is a fail value, the endoscope will typically fail the geometric distortion test. Textual displays 342 (FIG. 21) and 325 (FIG. 20) indicate whether the endoscope has passed the geometric distortion test.

Figure 22:
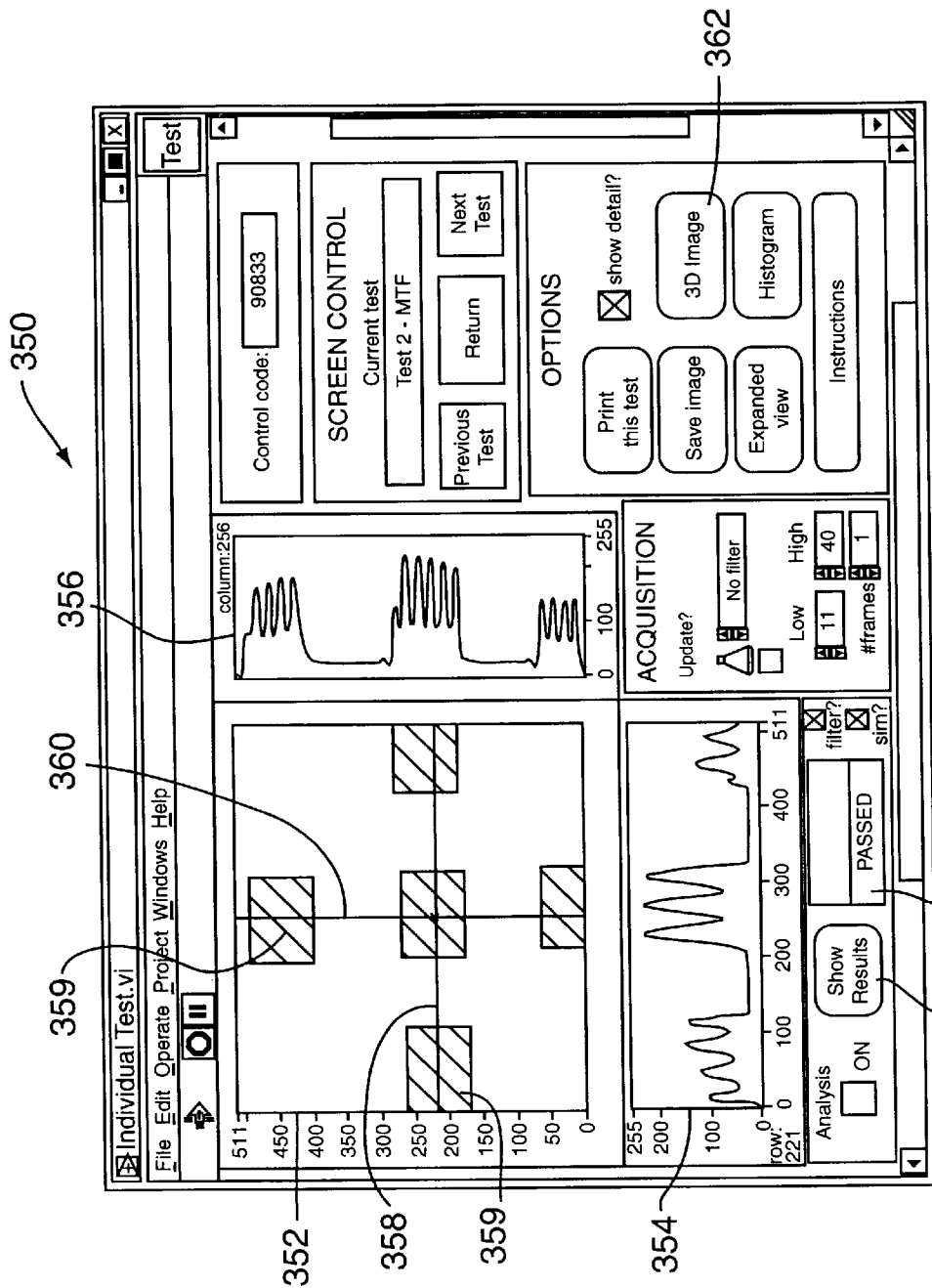
FIG. 22 is an exemplary display of a graphical user interface provided by the computer of FIG. 1 for evaluating the results of an MTF test.

Referring again to FIG. 12, actuation of the button 190 initiates analysis of the results of the MTF test, and causes the GUI to provide a display 350 of the type shown in FIG. 22. The display 350 is substantially similar to the display 210 of FIG. 14 for analyzing the results of the reflective symmetry test. The display 350 includes a region 352 showing a graphical display indicative of the intensity pattern of the transmitted beam, and regions 354 and 356 for displaying cross-sectional views of the display 352 defined by the bars 358 and 360. With reference to the display region 352, a black paper mask (not shown) forming a part of the semi-transparent target 48 (FIG. 3) defines a plurality of apertures, which each in turn define a respective region 359 of the transmitted beam image within which the MTF is measured.

A button 362 on the display 350 allows generation of a three-dimensional image corresponding to the image of the display 352 and indicative of the intensity pattern of the transmitted beam. The three-dimensional image and the three regions 352, 354 and 356 each provide an indication of the MTF at different locations in the transmitted image. A user may be able to evaluate the endoscope based on this type of graphical feedback alone, and determine whether or not the endoscope is acceptable. However, as discussed below, the computer system 32 of the present invention further provides an explicit indication of whether a tested endoscope has passed the MTF test.

Figure 23:
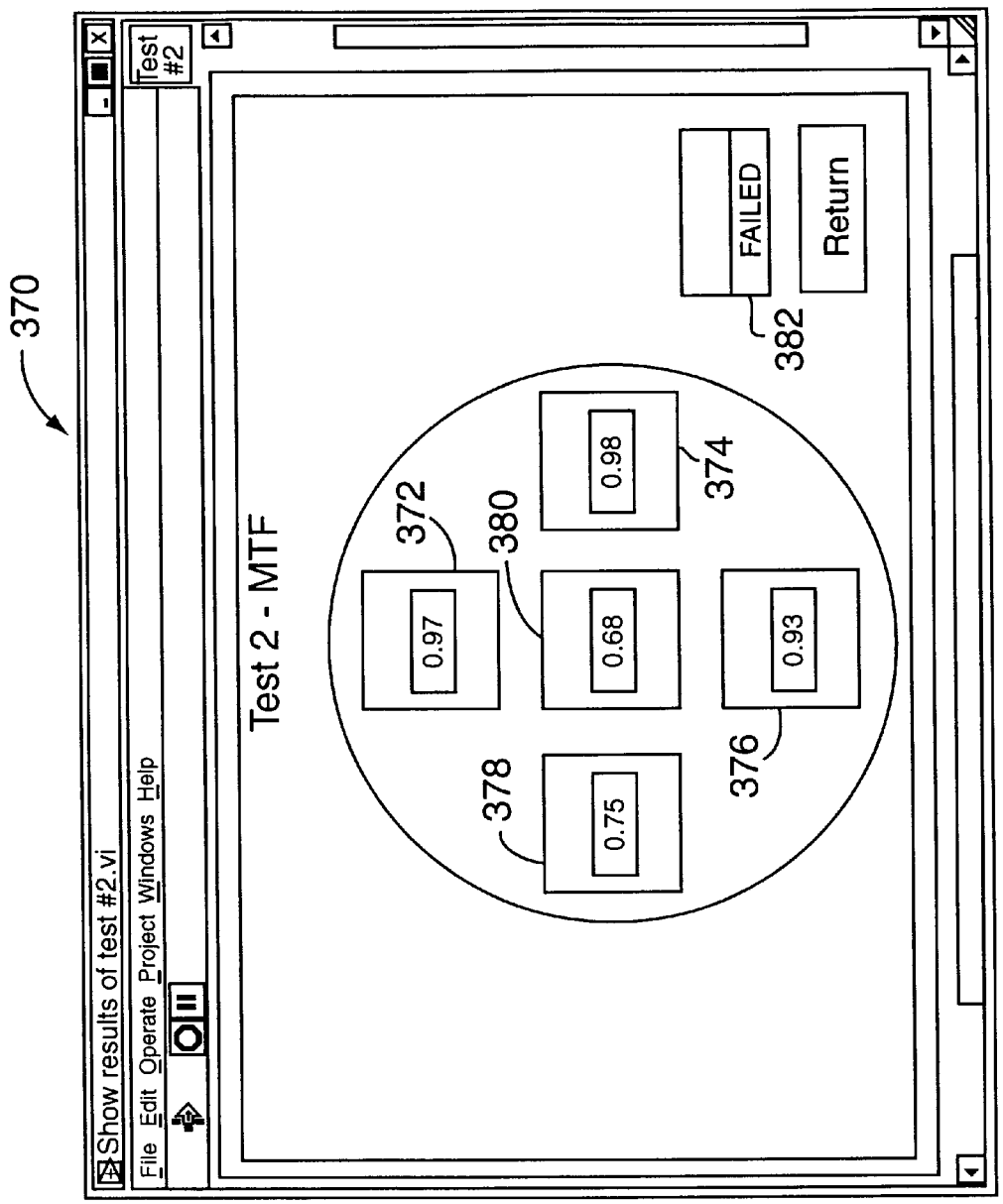
FIG. 23 is another exemplary display of a graphical user interface provided by the computer of FIG. 1 for evaluating the results of an MTF test.

Upon actuation of a button 364 in the display 350, the GUI 171 provides a display 370 of the type shown in FIG. 23. The display 370 includes indicators 372, 374, 376, 378 and 380 which each indicate the MTF at a respective location 359 in the transmitted beam. Preferably, as indicated by the shaded regions 359 of the display 352 of FIG. 22, the MTF is measured at the approximate center of the transmitted image, and at locations on the periphery of the transmitted image, including above center, below center, to the right of center, and to the left of center. As discussed above, the modulation at a respective location within the transmitted beam is defined as follows:

modulation=(maximum intensity−minimum intensity)÷(maximum intensity+minimum intensity);

and the MTR at the respective location in a transmitted image is defined as follows:

MTR=modulation of image after transmission÷modulation of image before transmission.

As discussed above, the sinusoidally-varying medium 48 causes the intensity of the transmitted beam to vary sinusoidally along a predetermined direction in the beam, and the video signals generated by the video system 22 correspondingly vary sinusoidally with respect to time and thus are indicative of the intensity pattern of the transmitted image. The maximum and minimum intensities used in calculating the modulation are each measured with respect to an intensity of the video signal corresponding to a "black" (dark or unilluminated) intensity. Those skilled in the art will note that the signal intensity corresponding to "black" is different from the "back porch" level of the video signal, which is typically lower.

In response to a user command input through the GUI 171, the computer system 32 transmits any of the above-described displays to the printer 34. The printed display is useful in the analysis of test results, and thus in evaluating the performance characteristics of tested endoscopes, in that it may be transmitted (i.e., sent by mail, electronic mail or facsimile) to distant users unable to view the monitors of FIG. 1. Similarly, in response to a user command input through the GUI 171, the computer system 32 stores any of above-described displays by saving signals indicative of the display to a storage medium, such as a hard disk or floppy disk.

Although the invention has been shown and described with respect to a preferred embodiment thereof, it would be understood by those skilled in the art that other various changes, omissions and additions thereto may be made without departing from the spirit and scope of the invention as defined in the appended claims. For example, there are other fiber-optic scopes, known as bore scopes, which are similar to endoscopes for use in medical applications, but have much larger length-to-diameter ratios. Bore scopes are used to examine the internal subassemblies in large engines, compressors and turbine machinery. Such bore scopes may be tested and evaluated using the system of the present invention with minimal modification of the preferred embodiment presented herein.

As will also be recognized by those skilled in the pertinent art, the computer system and its related software for performing the endoscope tests may be separate from the other components of the overall system of FIG. 1. In such an embodiment, the test results would be stored, i.e. on a magnetic media such as a floppy disk or hard drive, and transmitted to the computer system for analysis and evaluation when desired.

Accordingly, this detailed description of a preferred embodiment is to be taken in an illustrative, as opposed to a limiting sense.

What is claimed is:

1. A method for evaluating performance characteristics of endoscopes, comprising:

generating a first set of signals indicative of intensities at predetermined locations in a beam of light transmitted through an endoscope, wherein the locations in the beam correspond to predetermined locations in the endoscope; and generating a second set of signals responsive to the first set of signals which are indicative of the performance characteristics of the endoscope.

2. The method of claim 1, wherein the second set of signals are indicative of the degree to which the endoscope attenuates the intensity of the beam at predetermined locations in the beam.

3. The method of claim 1, wherein the second set of signals are indicative of the degree to which the endoscope attenuates the beam within a predetermined intensity range of the beam.

4. The method of claim 3, further comprising:

generating a three-dimensional image in response to the first set of signals indicative of the attenuation of the beam.

5. The method of claim 3, further comprising:

generating an image in which each of a plurality of colors in the image corresponds to one of a plurality of intensity ranges.

6. The method of claim 3, wherein the second set of signals are indicative of a plurality of intensity ranges, and the number of predetermined locations within the beam having an intensity within each intensity range.

7. The method of claim 3, further comprising:

comparing the second set of signals to signals indicative of a predetermined attenuation; and generating signals indicative of a passing condition if more than a predetermined number of locations define an attenuation less than the predetermined attenuation.

8. The method of claim 2, further comprising:

generating signals which are indicative of the degree to which the endoscope attenuates an intensity below a predetermined intensity at predetermined locations in the beam.

9. The method of claim 1, wherein the second set of signals are indicative of the MTF at a location in the beam.

10. The method of claim 9, further comprising:

generating an image corresponding to the intensity variation along a plurality of approximately collinear locations in the beam.

11. The method of claim 9, further comprising:

generating signals indicative of a passing condition if the MTF at the location in the beam is greater than a predetermined MTF value.

12. The method of claim 9, further comprising:

generating signals indicative of the MTF at a plurality of locations; and generating signals indicative of a passing condition if each MTF is greater than a predetermined MTF value.

13. The method of claim 1, wherein the second set of signals are indicative of the degrees to which the endoscope optically distorts the beam at predetermined locations in the beam.

14. The method of claim 13, further comprising:

generating an image corresponding to the intensity variation along a plurality of substantially collinear locations in the beam.

15. The method of claim 13, further comprising:

generating signals indicative of a passing condition if the optical distortion is greater than a predetermined distortion value.

16. The method of claim 13, further comprising:

generating signals indicative of the optical distortion at a plurality of locations, and generating further signals indicative of a passing condition if the plurality of optical distortions are each greater than a predetermined distortion value.

17. The method of claim 1, further comprising:

generating a database for storing the first set of signals, and for presenting a selected subset of the first set of signals.

18. The method of claim 17, wherein the step of generating a database comprises:

generating a database for storing the first set of signals, the second set of signals, and signals which uniquely identify the endoscope.

19. An apparatus for evaluating performance characteristics of endoscopes, comprising:

means for generating intensity signals indicative of intensities at predetermined locations in a beam of light transmitted through an endoscope, wherein the locations in the beam correspond to predetermined locations in the endoscope; and means for generating signals responsive to the intensity signals and indicative of the performance characteristics of the endoscope.

20. An apparatus as defined in claim 19, further comprising:

means for generating signals responsive to the intensity signals and indicative of the degree to which the endoscope attenuates the intensity of the beam at the predetermined locations within the beam; and means for generating signals indicative of a pass condition if more than a predetermined number of locations in the beam have an attenuation less than a predetermined attenuation.

21. An apparatus as defined in claim 19, further comprising:

means for generating signals responsive to the intensity signals and indicative of the MTF at a location in the beam; and means for generating signals indicative of a pass condition if the MTF is greater than a predetermined MTF value.

* * * * *